United States Patent
Suzuki et al.

(10) Patent No.: US 10,897,416 B2
(45) Date of Patent: Jan. 19, 2021

(54) NETWORK BAND MEASUREMENT DEVICE, SYSTEM, METHOD, AND PROGRAM

(71) Applicant: NEC Corporation, Tokyo (JP)

(72) Inventors: Motohiro Suzuki, Tokyo (JP); Yuki Ohno, Tokyo (JP)

(73) Assignee: NEC CORPORATION, Tokyo (JP)

(*) Notice: Subject to any disclaimer, the term of this patent is extended or adjusted under 35 U.S.C. 154(b) by 27 days.

(21) Appl. No.: 16/327,525

(22) PCT Filed: Sep. 1, 2017

(86) PCT No.: PCT/JP2017/031520
§ 371 (c)(1),
(2) Date: Feb. 22, 2019

(87) PCT Pub. No.: WO2018/043691
PCT Pub. Date: Mar. 8, 2018

(65) Prior Publication Data
US 2019/0190807 A1    Jun. 20, 2019

(30) Foreign Application Priority Data
Sep. 5, 2016  (JP) ................. 2016-172556

(51) Int. Cl.
*H04L 12/26*    (2006.01)
*H04L 29/14*    (2006.01)
*H04L 29/06*    (2006.01)

(52) U.S. Cl.
CPC ........ *H04L 43/0876* (2013.01); *H04L 43/087* (2013.01); *H04L 43/106* (2013.01);
(Continued)

(58) Field of Classification Search
CPC ............. H04W 72/1231; H04W 74/08; H04W 28/0236; H04L 45/745; G06F 16/2282
See application file for complete search history.

(56) References Cited

U.S. PATENT DOCUMENTS 7,180,858 B1    2/2007  Roy et al.
7,873,710 B2    1/2011  Kiley et al.
(Continued)

FOREIGN PATENT DOCUMENTS

CN    102317801 A    1/2012
JP    2011-142622 A    7/2011
(Continued)

OTHER PUBLICATIONS

Jain M et al. "End to End available bandwidth: measurement Methodology, Dynamics, and Relation with TCP Throughput", Computer Communication Review, ACM, New York, NY, US, vol. 32. No. 4 Oct. 1, 2002 (Oct. 1, 2802), pp. 205-308. (Year: 2002).*
(Continued)

*Primary Examiner* — Lan-Huong Truong
(74) *Attorney, Agent, or Firm* — Sughrue Mion, PLLC

(57) ABSTRACT

A transmitting side device generates a plurality of measurement packets of which the packet size is successively increased or decreased by a fixed number each time, includes in each measurement packet at least a packet number, a packet size, and a transmission time, to create a packet train, and transmits the packet train at predetermined equal intervals. A receiving side device measures the time of arrival of each of the measurement packets constituting the packet train, and extracts as a valid packet a series of measurement packets at a location where a change in the measured time of arrival matches an arrival time change model having a predetermined pattern. A network available band is computed using a measurement packet, among a series of measurement packets having equal arrival times, that has a maximum packet size.

20 Claims, 30 Drawing Sheets

(52) U.S. Cl.
CPC .............. *H04L 69/22* (2013.01); *H04L 69/40* (2013.01); *H04L 69/16* (2013.01)

(56) References Cited

U.S. PATENT DOCUMENTS

| | | | |
|---|---|---|---|
| 2004/0047367 | A1 | 3/2004 | Mammen |
| 2013/0058235 | A1* | 3/2013 | Johnsson ............ H04L 43/0882 370/252 |
| 2015/0180757 | A1 | 6/2015 | Oshiba |
| 2015/0189659 | A1 | 7/2015 | Mussot |
| 2017/0222930 | A1* | 8/2017 | Dhanabalan ............ H04L 69/04 |

FOREIGN PATENT DOCUMENTS

| | | |
|---|---|---|
| JP | 2014-116771 A | 6/2014 |
| WO | 2009/118602 A2 | 10/2009 |
| WO | 2011/132783 A1 | 10/2011 |
| WO | 2014/017140 A1 | 1/2014 |

OTHER PUBLICATIONS

Communication dated Jun. 28, 2019, from the Taiwanese Patent Office in counterpart application No. 106129235.
Communication dated Jul. 12, 2019, from the European Patent Office in counterpart European Application No. 17846694.2.
D. Kiwior et al., "PATHMON, A Methodology for Determining Available Bandwidth over an Unknown Network", IEEE, Sarnoff Symposium on Advances in Wired and Wireless Communication, Jan. 1, 2004, pp. 27-30 (4 pages total).
Manish Jain et al., "End-to-End Available Bandwidth: Measurement Methodology, Dynamics, and Relation with TCP Throughput", Computer Communication Review, Oct. 1, 2002, vol. 32, No. 4, pp. 295-308 (14 pages total).
Takashi Oshiba et al., "Quick End-to-end Available Bandwidth Estimation for Real-time Communication," Special Issue on Distributed Processing and Network Services, IPSJ Journal, Feb. 15, 2012, pp. 698-711, vol. 53, No. 2.
Written Opinion of the International Searching Authority of PCT/JP2017/031520 dated Nov. 21, 2017.
International Search Report of PCT/JP2017/031520 dated Nov. 21, 2017.
Communication dated Oct. 26, 2020, from the State Intellectual Property Office of the P.R.C in application No. 201780053350.6.

* cited by examiner

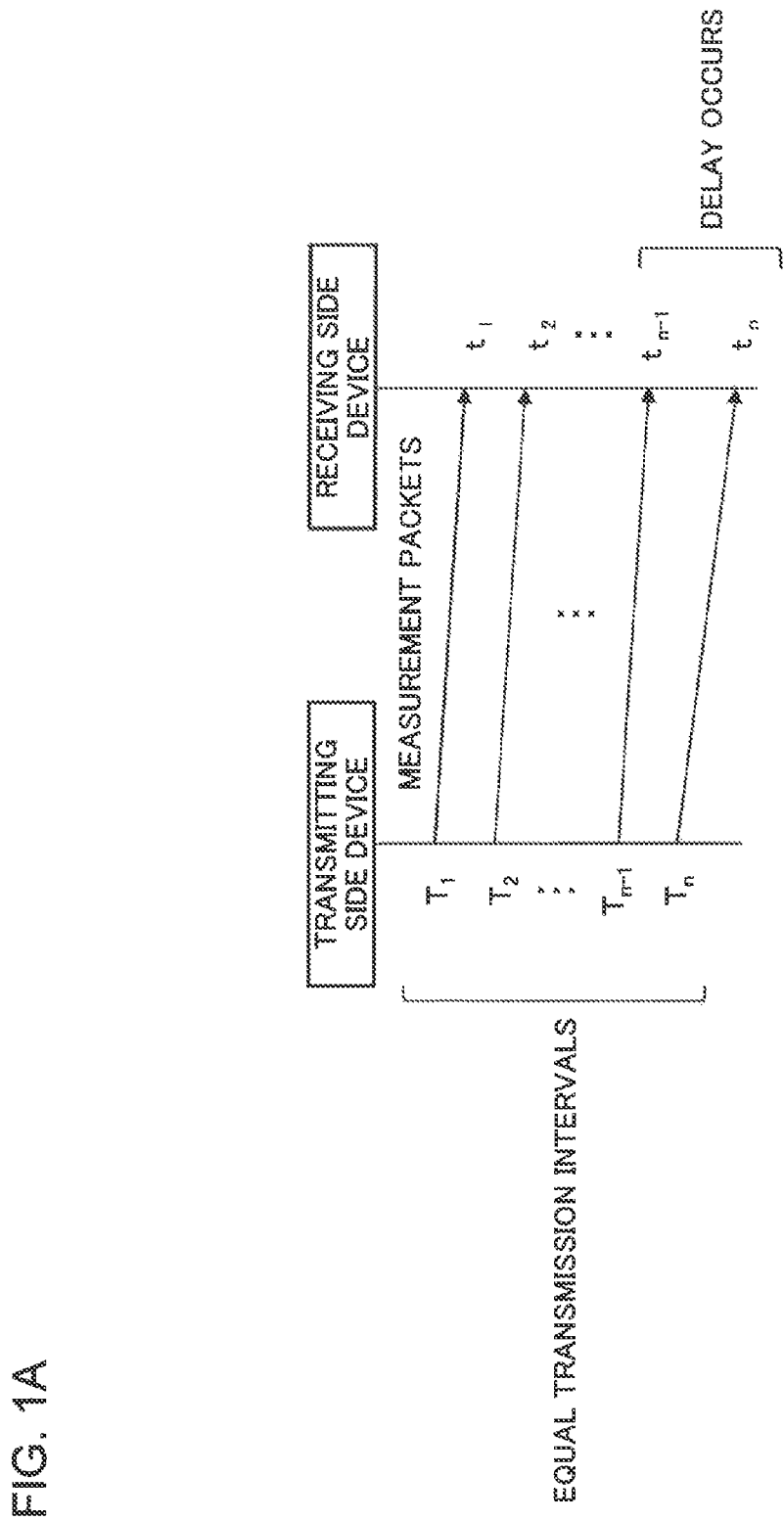

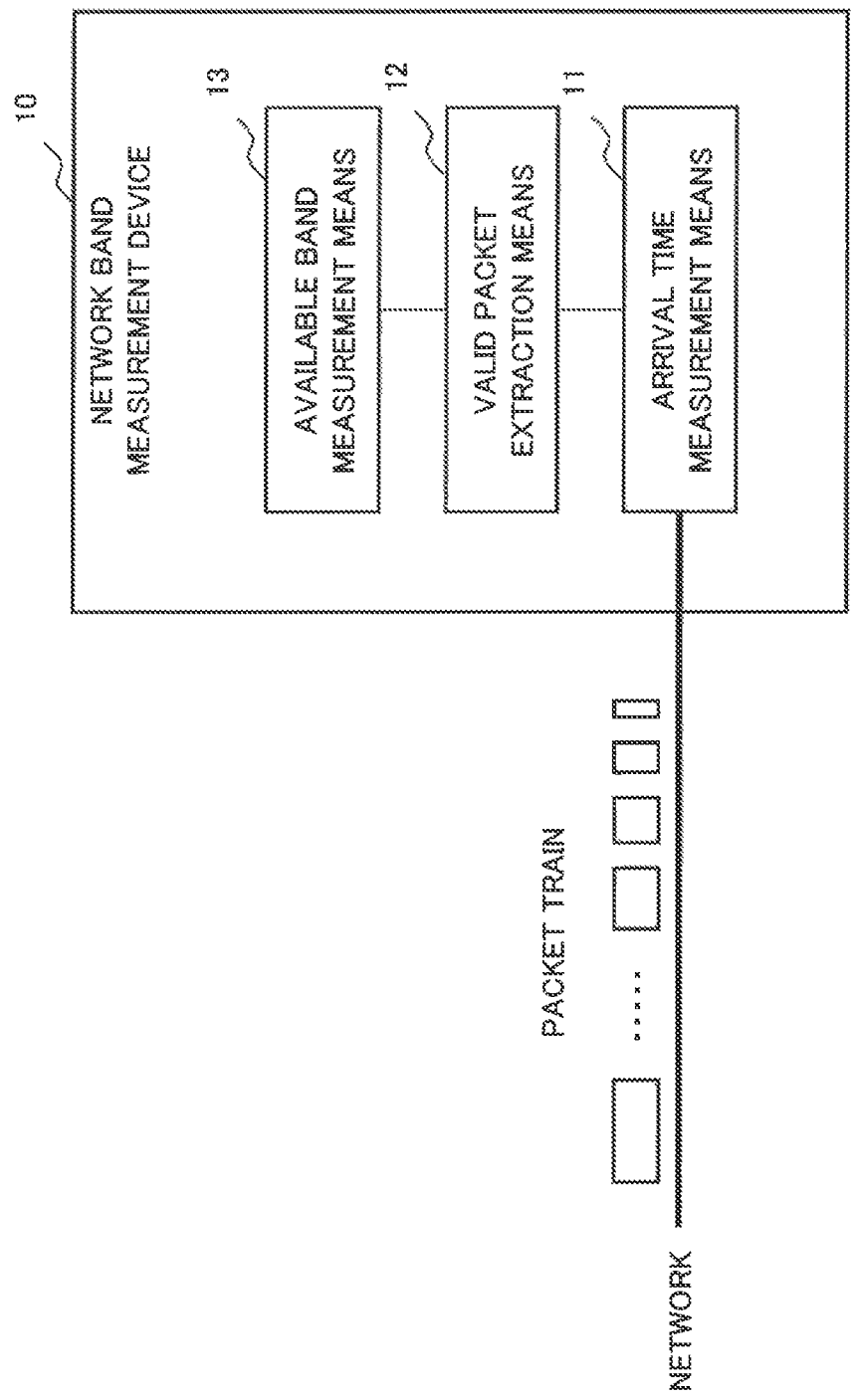

FIG. 10  INFORMATION EXAMPLE IN ARRIVAL TIME INFORMATION STORAGE UNIT

| PACKET NUMBER | PACKET SIZE | TRANSMISSION TIME | RECEPTION TIME | ARRIVAL TIME (SEC) | ARRIVAL TIME CHANGE (SEC) | ARRIVAL TIME CHANGE WITH ACCEPTABLE ERROR CONSIDERED |
|---|---|---|---|---|---|---|
| 1 | size a | HR/MIN/SEC | HR/MIN/SEC | 4.02 | | |
| 2 | size b | HR/MIN/SEC | HR/MIN/SEC | 5.11 | 1.09 | 1 |
| 3 | size c | HR/MIN/SEC | HR/MIN/SEC | 2.03 | -3.08 | -3 |
| 4 | size d | HR/MIN/SEC | HR/MIN/SEC | 3.04 | 1.01 | 1 |
| 5 | size e | HR/MIN/SEC | HR/MIN/SEC | 3.02 | -0.02 | 0 |
| 6 | size f | HR/MIN/SEC | HR/MIN/SEC | 3.03 | 0.01 | 0 |
| 20 | size h | HR/MIN/SEC | HR/MIN/SEC | 3.01 | 0.03 | 0 |
| 21 | size i | HR/MIN/SEC | HR/MIN/SEC | 5.04 | 2.03 | 0 |
| 22 | size j | HR/MIN/SEC | HR/MIN/SEC | 9.01 | 3.97 | 4 |
| 107 | size n | HR/MIN/SEC | HR/MIN/SEC | 70.02 | 30.04 | 30 |
| 108 | size o | HR/MIN/SEC | HR/MIN/SEC | 65.11 | -4.91 | -5 |
| 109 | size p | HR/MIN/SEC | HR/MIN/SEC | 63.04 | -2.07 | -2 |
| 110 | size q | HR/MIN/SEC | HR/MIN/SEC | 72.01 | 8.97 | 9 |

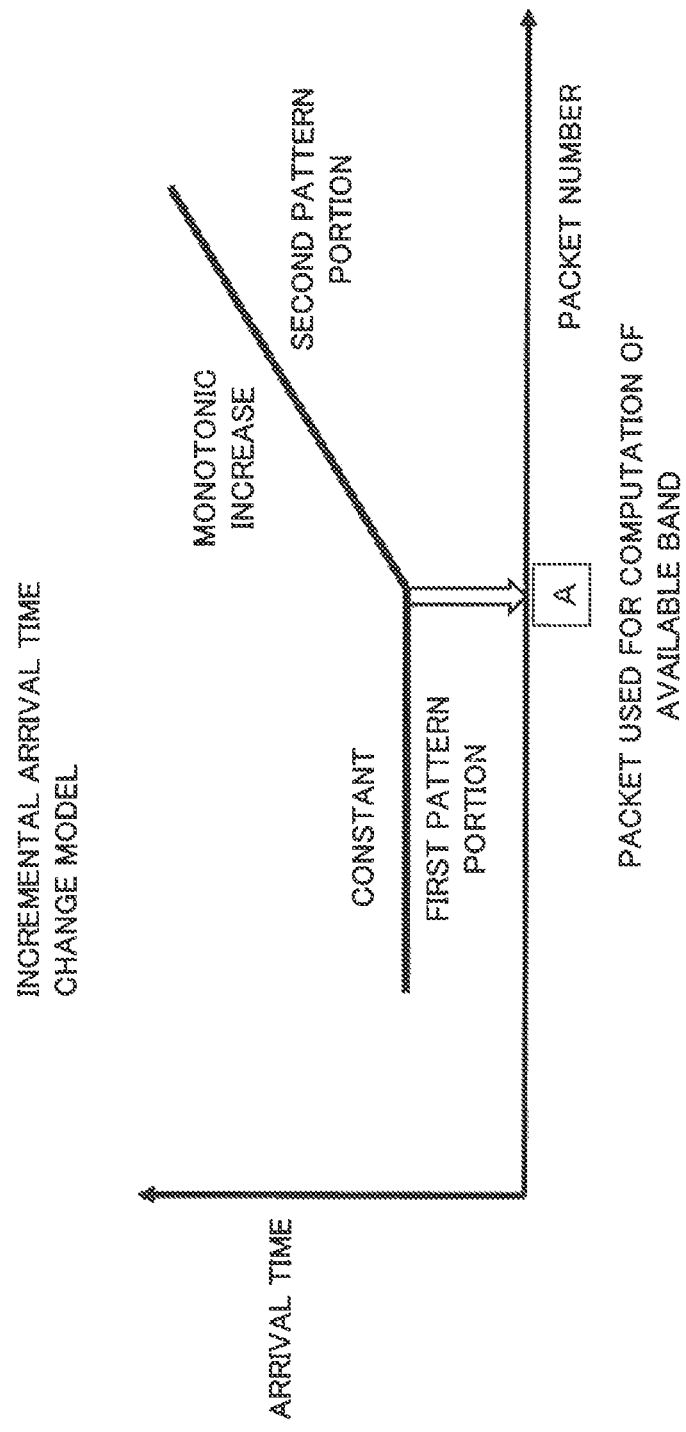

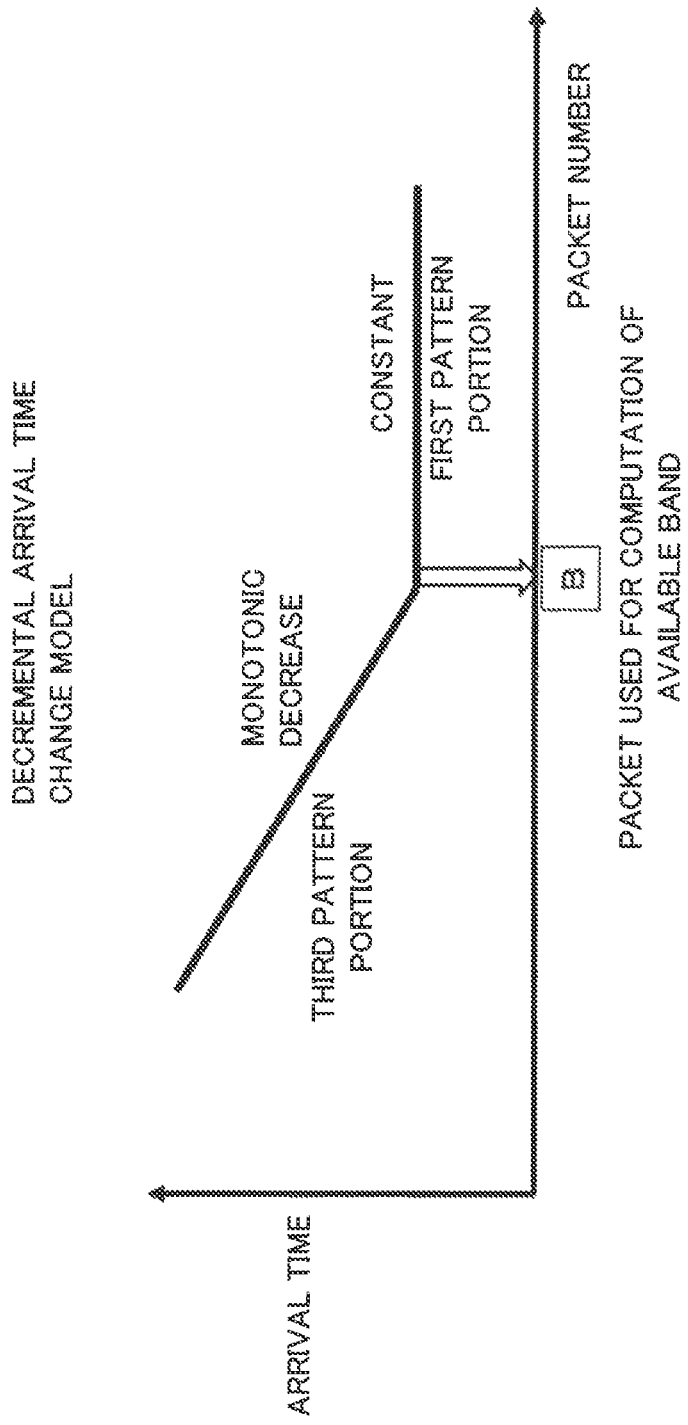

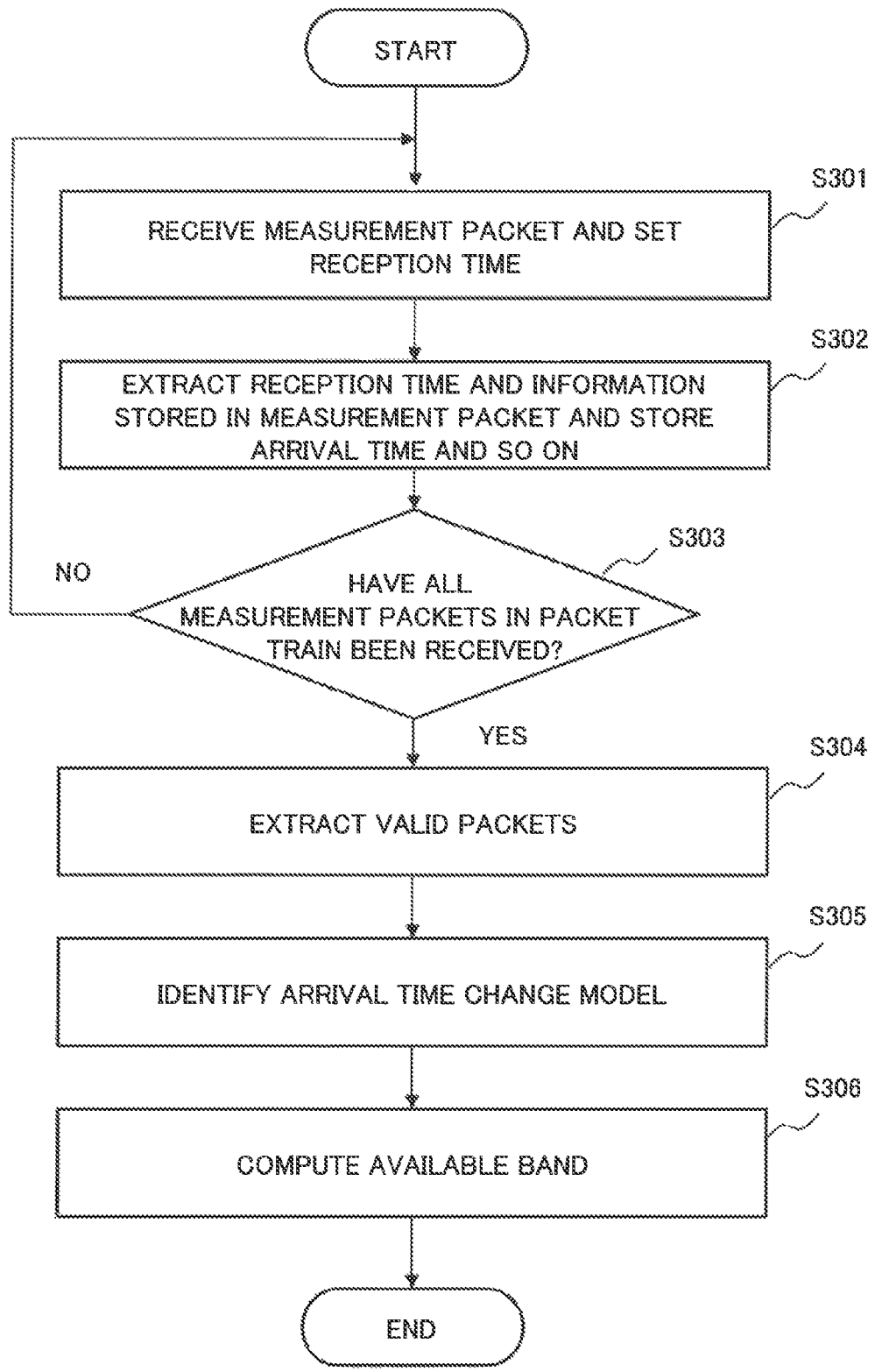

NETWORK BAND MEASUREMENT DEVICE, SYSTEM, METHOD, AND PROGRAM

CROSS REFERENCE TO RELATED APPLICATIONS

This application is a National Stage of International Application No. PCT/JP2017/031520 filed Sep. 1, 2017, claiming priority based on Japanese Patent Application No. 2016-172556 filed Sep. 5, 2016, the entire disclosure of which is incorporated herein by reference.

TECHNICAL FIELD

The present invention relates to a network band measurement device, system, method, and program and particularly relates to a network band measurement device, system, method, and program that measure a band available for communication through a network.

BACKGROUND ART

Recent years, services enabling data to be shared in real time among terminals using an internet protocol (IP) network have been increasingly provided in association with popularization of smartphones.

Needs from corporations and carriers that are to provide such services on networks have increased to check quality conditions of the networks and improve equipment of the networks to enable service users to use the services comfortably. In order to perform the equipment improvement, a need to have accurate understanding of quality conditions of networks has increased.

As a solution to having accurate understanding of quality conditions of networks, for example, incorporating a measurement function into a terminal that a service user uses and measuring an available band between the terminal and a measurement server installed in a data aggregation center or the like in a periodic manner is conceivable. A solution in which an available band of a black box section, in which corporations and carriers providing network services are not involved, is observed from the outside and existence of a bottleneck serving as a deterioration factor in a service use feeling is perceived may also be possible.

Note that an available band is equivalent to a free band that is obtained by subtracting, from a physical band of an IP network, the amount of traffic of other types flowing through the IP network. For example, when a network application, such as a data distribution system of videos, voices, and the like, performs communication, flow of traffic exceeding an available band causes congestion to occur in the network, which leads to deterioration in quality actually felt by users.

PTL1 to PTL3 disclose, as technologies for checking quality conditions of networks, technologies of, using a packet train constituted by a series of measurement packets, measuring an available band in a network among terminals.

PTL1 discloses a network band measurement system that performs measurement of a band available in an IP network and throughput achievable by using user datagram protocol (UDP) communication in a short period of time.

In a technology disclosed in PTL1, the receiving side receives a packet train including a plurality of measurement packets the packet sizes of which successively increase and that are transmitted at constant transmission intervals and an available band is computed based on change in reception intervals between the respective measurement packets measured at the receiving side. Specifically, at the receiving side, measured reception intervals and the transmission intervals are compared with each other and an available band of the network is computed using a measurement packet, among measurement packets the reception intervals of which are the same as the transmission intervals, that has a maximum packet size. The measurement packet, among measurement packets the reception intervals of which are the same as the transmission intervals, that has a maximum packet size means a packet size of a measurement packet immediately before relations between the reception intervals and the transmission intervals that have been the same as each other change and an occurrence of delay in the reception intervals is detected.

Note that PTL1 also refers to using a packet train including measurement packets the packet sizes of which successively decrease. In this case, an available band is computed using a packet size of a measurement packet at a point of time when the reception intervals that have been delayed from the transmission interval are detected to be the same as the transmission interval.

PTL2 discloses a technology of dynamically changing measurement resolution of an available band with a low communication load.

In the technology disclosed in PTL2, the measurement resolution is changed by the transmitting side through adjusting packet sizes of a packet train for measurement, based on the amount of change in measured values of the available band measured by the receiving side. Specifically, the transmitting side successively receives available bands measured by the receiving side and, when determining that the measurement resolution is required to be changed, generates a packet train the minimum packet size, the maximum packet size, and the packet size increment of which are changed.

PTL3 discloses a technology of achieving estimation of an available band swiftly and with high accuracy under a situation where fluctuation occurs in reception times of packets for available band estimation due to delay caused by influence from noise and the like in a wireless line and causes estimation accuracy to be reduced.

In the technology disclosed in PTL3, an improvement in the estimation accuracy is achieved by detecting as a delay start packet a packet for estimation at which delay starts to occur, using a reception time and a transmission time of each of the first and last packets for estimation, which are least likely to be influenced by noise and the like. Specifically, a delay start packet is detected by solving a quadratic equation based on the number of packets for estimation, a physical band of the network, an accumulated value of packet delay periods required for transmission, and a packet increment size of the packets for estimation.

CITATION LIST

Patent Literature

PTL1: Japanese Unexamined Patent Application Publication 2011-142622
PTL2: WO 2011/132783
PTL3: Japanese Unexamined Patent Application Publication 2014-116771

SUMMARY OF INVENTION

Technical Problem

The technologies disclosed in PTL1 and PTL2 have a problem in that computation accuracy of an available band deteriorates in a network environment where delay irregularly occurs.

In the technologies disclosed in PTL1 and PTL2, a predetermined model (reception interval change model) is assumed with respect to reception intervals of a group of packets in a packet train in order to compute an available band. For example, in the technology disclosed in PTL1, when a packet train including packets the packet sizes of which successively increase is used, a reception interval change model is assumed in which the reception intervals of packets are constant from the first received packet to a received packet having a certain size and thereafter monotonically increase. The available band is computed based on the packet size of a packet at a changing point at which the reception intervals change from being constant to monotonic increase.

However, in a network where delay irregularly occurs, the reception interval change model, which exhibits a state in which the reception intervals are constant and a state in which the reception intervals monotonically increase, is not always applicable without modification.

FIGS. 1A and 1B are diagrams describing change in arrival time of measurement packets and an example of change in arrival time of measurement packets in a network environment where delay irregularly occurs, which is assumed in the present invention. FIG. 1A illustrates how reception intervals change due to change in arrival time that is a period from a point of time when each measurement packet is transmitted from a transmitting side device to a point of time when the measurement packet is received by a receiving side device. FIG. 1B illustrates an example of change in arrival time in a network environment where delay irregularly occurs.

According to the example, the arrival time first fluctuates because irregular delays occur on packets in a vicinity of the head of a packet train, thereafter becomes constant, next monotonically increases from a point of time, and finally fluctuates again because irregular delays occur.

When an available band is measured using the technologies in PTL1 and PTL2 under such a situation, the measurement is affected by change in reception intervals caused by irregular delays and accuracy in computation of an available band deteriorates.

Although the technology disclosed in PTL3 is a technology for solving a problem in that fluctuation occurs in reception times of packets for available band estimation due to delay caused by influence from noise and the like and causes estimation accuracy to be reduced, there is another problem in detection of a delay start packet. For example, since the delay caused by influence from noise and the like is modeled by a quadratic function, computation processing based on the number of packets for estimation, a physical band of the network, an accumulated value of packet delay periods required for transmission, and a packet increment size of the packets for estimation needs to be performed. Further, although the technology in PTL3 assumes a point (changing point) at which delay starts to occur to be only one point, a plurality of changing points may occur in a group of packets included in a packet train in an actual network.

Thus, in the technology disclosed in PTL3, computation accuracy of an available band also deteriorates in a network environment where delay irregularly occurs.

An object of the present invention is to provide a network band measurement device, system, method, and program that are capable of computing an available band with high accuracy and by a simple configuration even in a network environment where delay irregularly occurs.

Solution to Problem

In order to achieve the object described above, a network band measurement device according to one aspect of the present invention includes an arrival time measurement means for receiving, from a network, a packet train that is a plurality of measurement packets the packet sizes of which successively increase or decrease by a fixed number for each packet and is transmitted at predetermined equal intervals, each measurement packet including at least a packet number, a packet size, and a transmission time, and measuring arrival time of the respective measurement packets constituting the packet train, based on reception times of the received measurement packets and the transmission times included in the measurement packets, a valid packet extraction means for extracting as valid packets a series of measurement packets in an interval where change in the measured arrival time matches an arrival time change model having a predetermined pattern, and an available band measurement means for, in the arrival time change model indicated by the valid packets, computing an available band of the network, using a measurement packet, among a series of measurement packets having the same arrival time, that has a maximum packet size.

A network band measurement system according to another aspect of the present invention includes a transmitting side device that includes a measurement packet generation means for generating a plurality of measurement packets the packet sizes of which successively increase or decrease by a fixed number for each packet and outputting as a packet train a series of the generated measurement packets, each measurement packet including at least a packet number and a packet size, and a measurement packet transmission means for transmitting the packet train at predetermined equal intervals, each of the measurement packets including a transmission time at which the measurement packet is transmitted to a network, and a network band measurement device described above as a receiving side device connected to the transmitting side device via the network.

Further, a network band measurement method according to still another aspect of the present invention includes receiving, from a network, a packet train that is a plurality of measurement packets the packet sizes of which successively increase or decrease by a fixed number for each packet and is transmitted at predetermined equal intervals, each measurement packet including at least a packet number, a packet size, and a transmission time, measuring arrival time of the respective measurement packets constituting the packet train, based on reception times of the received measurement packets and the transmission times included in the measurement packets, extracting as valid packets a series of measurement packets in an interval where change in the measured arrival time matches an arrival time change model having a predetermined pattern, and, in the arrival time change model indicated by the valid packets, computing an available band of the network, using a measurement packet, among a series of measurement packets having the same arrival time, that has a maximum packet size.

Further, another network band measurement method according to still another aspect of the present invention includes generating a plurality of measurement packets the packet sizes of which successively increase or decrease by a fixed number for each packet and transmitting as a packet train a series of the generated measurement packets at predetermined equal intervals, each measurement packet including at least a packet number, a packet size, and a transmission time at which the measurement packet is transmitted to a network, measuring arrival time of the respective measurement packets constituting the packet train, based on reception times of the measurement packets received from the network and the transmission times included in the measurement packets, extracting as valid packets a series of measurement packets in an interval where change in the measured arrival time matches an arrival time change model having a predetermined pattern, and, in the arrival time change model indicated by the valid packets, computing an available band of the network, using a measurement packet, among a series of measurement packets having the same arrival time, that has a maximum packet size.

Further, a program according to still another aspect of the present invention causes a computer to operate as an arrival time measurement function means for receiving, from a network, a packet train that is a plurality of measurement packets the packet sizes of which successively increase or decrease by a fixed number for each packet and is transmitted at predetermined equal intervals, each measurement packet including at least a packet number, a packet size, and a transmission time, and measuring arrival time of the respective measurement packets constituting the packet train, based on reception times of the received measurement packets and the transmission times included in the measurement packets, a valid packet extraction function means for extracting as valid packets a series of measurement packets in an interval where change in the measured arrival time matches an arrival time change model having a predetermined pattern, and an available band measurement function means for, in the arrival time change model indicated by the valid packets, computing an available band of the network, using a measurement packet, among a series of measurement packets having the same arrival time, that has a maximum packet size.

Advantageous Effects of Invention

The present invention enables an available band to be computed with high accuracy and by a simple configuration even in a network environment where delay irregularly occurs.

BRIEF DESCRIPTION OF DRAWINGS

FIGS. 1A and 1B are diagrams describing change in arrival time of measurement packets and an example of change in arrival time of measurement packets in a network environment where delay irregularly occurs, which is assumed in the present invention.

FIG. 2 is a block diagram exemplifying a configuration of a network band measurement device according to a first example embodiment of the present invention.

FIG. 10 is a diagram exemplifying information stored in an arrival time information storage unit.

FIGS. 12A and 12B are diagrams describing arrival time change models.

FIG. 13 is a flow diagram exemplifying operation of a network band measurement method according to the second example embodiment of the present invention.

EXAMPLE EMBODIMENT

An outline of embodiments for embodying the present invention will be described.

When a transmission rate of packets exceeds an available band of a network when the packets pass through the network, delay occurs in arrival time of the packets and reception intervals between the packets received by a receiving side device increase with respect to transmission intervals at a transmitting side device.

Figure 1B:
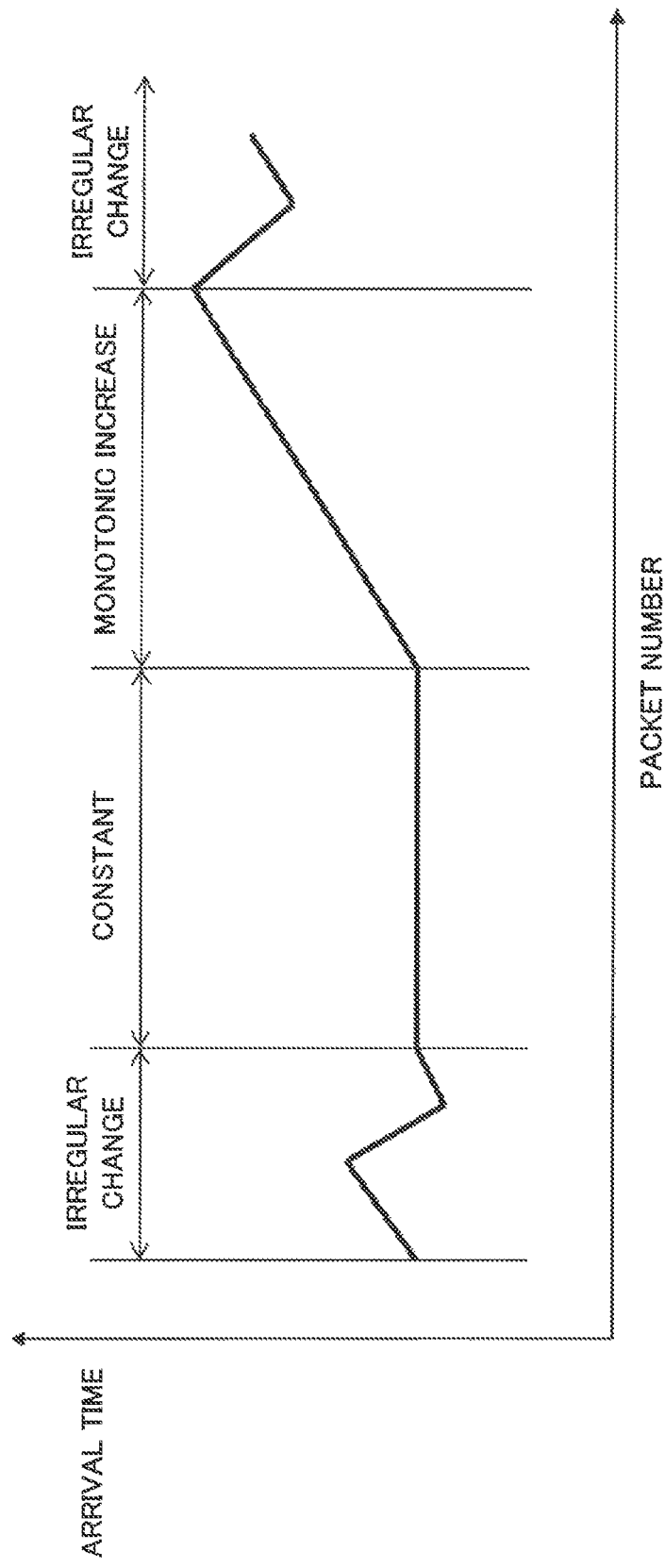

For this reason, as illustrated in FIG. 1A, the available band is estimated by measuring "$(T_n - T_{n-1}) - (t_n - t_{n-1})$", which is temporal change in reception intervals at the receiving side device with respect to transmission intervals at the transmitting side device, and detecting a point at which the temporal change departs from zero. Since the formula representing the temporal change can be transformed to "$(T_n-t_n)-(T_{n-1}-t_{n-1})$", the estimation of the available band can be achieved by measuring a temporal change between arrival time of an n-th measurement packet and arrival time of an (n−1)-th measurement packet.

That is, when measurement packets the packet sizes of which successively increase by a fixed number for each packet are used, a transmission rate of the measurement packets within a range of an available band of the network does not cause a difference to be generated among arrival time of the respective measurement packets and the temporal change in the arrival time is zero. At a point of time when the transmission rate of the measurement packets exceeds the available band of the network, the arrival time starts to increase and the temporal change also increases.

When measurement packets the packet sizes of which successively decrease by a fixed number for each packet are used, arrival time successively decreases as the packet sizes decrease while a transmission rate exceeds the available band. At a point of time when the transmission rate comes to satisfy the available band in association with decrease in the packet sizes, the arrival time becomes constant. In this case, the temporal change in the arrival time successively decreases, and, after a point of time when the transmission rate of the measurement packets enters within a range of the available band of the network, the temporal change becomes zero.

For detection of a measurement packet at the point of time when the change in the arrival time becomes zero, the example embodiments extract as valid packets an arrival time change model in which the change in the arrival time has a predetermined pattern. The available band is computed based on a packet size and a transmission interval $(T_n-T_{n-1})$ of a measurement packet at the detected point of time when the change in the arrival time becomes zero.

Example embodiments for embodying the present invention will be described in detail below with reference to the drawings.

Note that the example embodiments are exemplifications. Devices, methods and the like disclosed herein are not limited to configurations in the following example embodiments. In addition, reference numerals assigned in the drawings are given for convenience sake as an example for assisting understanding and are not intended to suggest any limitation. Further, directions of arrows in the drawings indicate only an example and do not limit directions of signals between blocks.

First Example Embodiment

A first example embodiment will be described with reference to FIGS. 2 to 7.

FIG. 2 is a block diagram exemplifying a configuration of a network band measurement device according to the first example embodiment of the present invention.

A network band measurement device 10 of the first example embodiment of the present invention is configured to include an arrival time measurement means 11, a valid packet extraction means 12, and an available band measurement means 13.

The arrival time measurement means 11 receives transmitted measurement packets each of which includes at least a packet number, a packet size, and a transmission time from a network. A plurality of measurement packets are strung at predetermined equal intervals and thereby constitute a packet train, and packet sizes of the measurement packets constituting the packet train successively increase or decrease by a fixed number for each packet. The arrival time measurement means 11, based on reception times of the received measurement packets and the transmission times included in the received measurement packets, measures arrival time of the respective measurement packets constituting the packet train.

The valid packet extraction means 12 extracts as valid packets a series of measurement packets in an interval where change in the measured arrival time matches an arrival time change model having a predetermined pattern.

The available band measurement means 13, in the arrival time change model indicated by the valid packets, computes an available band of the network, using a measurement packet, among a series of measurement packets having the same arrival time, that has a maximum packet size.

Figure 3:
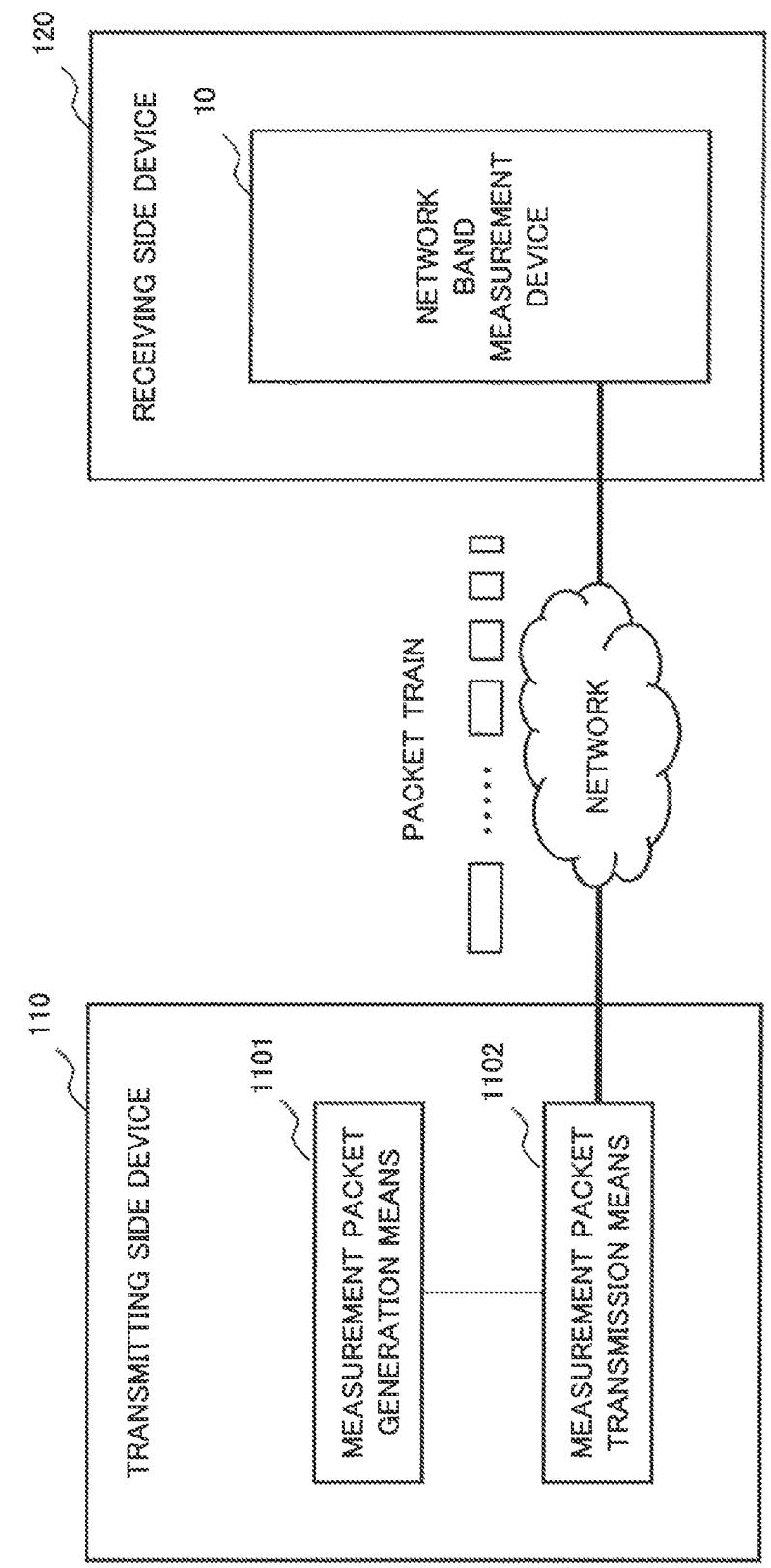
FIG. 3 is a block diagram exemplifying a configuration of a network band measurement system according to the first example embodiment of the present invention.

FIG. 3 is a block diagram exemplifying a configuration of a network band measurement system according to the first example embodiment of the present invention.

A network band measurement system 1 of the first example embodiment of the present invention has a transmitting side device 110 and a receiving side device 120 interconnected via a network.

The transmitting side device 110 is configured to include a measurement packet generation means 1101 and a measurement packet transmission means 1102.

The measurement packet generation means 1101 generates a plurality of measurement packets the packet sizes of which successively increase or decrease by a fixed number for each packet and outputs as a packet train a series of the generated measurement packets, each measurement packet including at least a packet number and a packet size.

The measurement packet transmission means 1102 transmits the packet train at predetermined equal intervals, each of the measurement packets including a transmission time at which the measurement packet is transmitted to the network.

On the other hand, as the receiving side device 120, the network band measurement device 10 described above is used.

Figure 4:
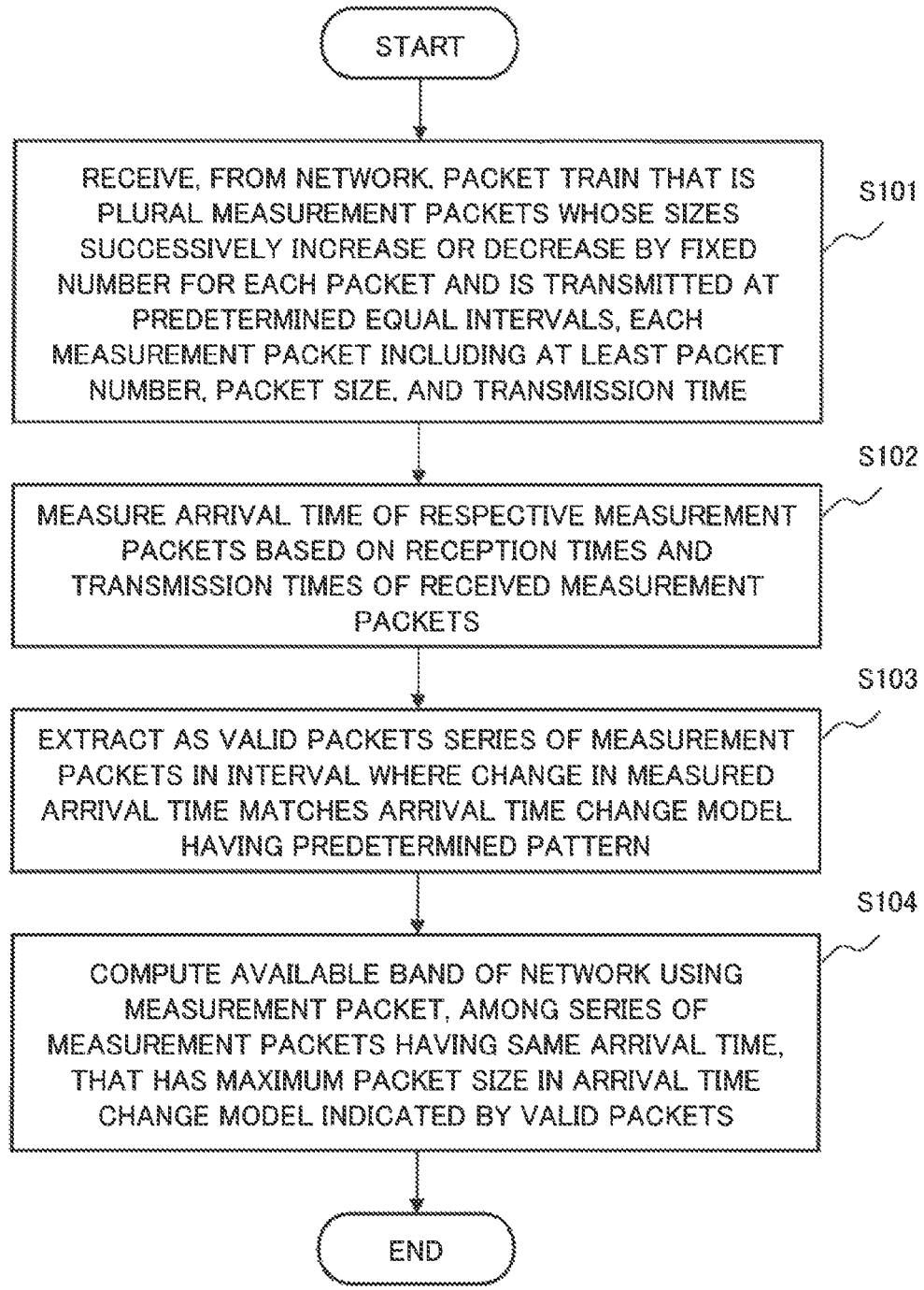
FIG. 4 is a flow diagram exemplifying operation of a network band measurement method according to the first example embodiment of the present invention.

FIG. 4 is a flow diagram exemplifying operation of a network band measurement method according to the first example embodiment of the present invention.

A packet train that is transmitted at predetermined equal intervals and is constituted by a plurality of measurement packets the packet sizes of which successively increase or decrease by a fixed number for each packet and in each of which at least a packet number, a packet size, and a transmission time are included is received from the network (S101).

Based on the reception times of the received measurement packets and the transmission times included in the received measurement packets, arrival time of the respective measurement packets constituting the packet train is measured (S102).

A series of measurement packets in an interval where change in the measured arrival time matches an arrival time change model having a predetermined pattern are extracted as valid packets (S103).

In the arrival time change model indicated by the valid packets, an available band of the network is computed using a measurement packet, among a series of measurement packets having the same arrival time, that has a maximum packet size (S104).

Figure 5:
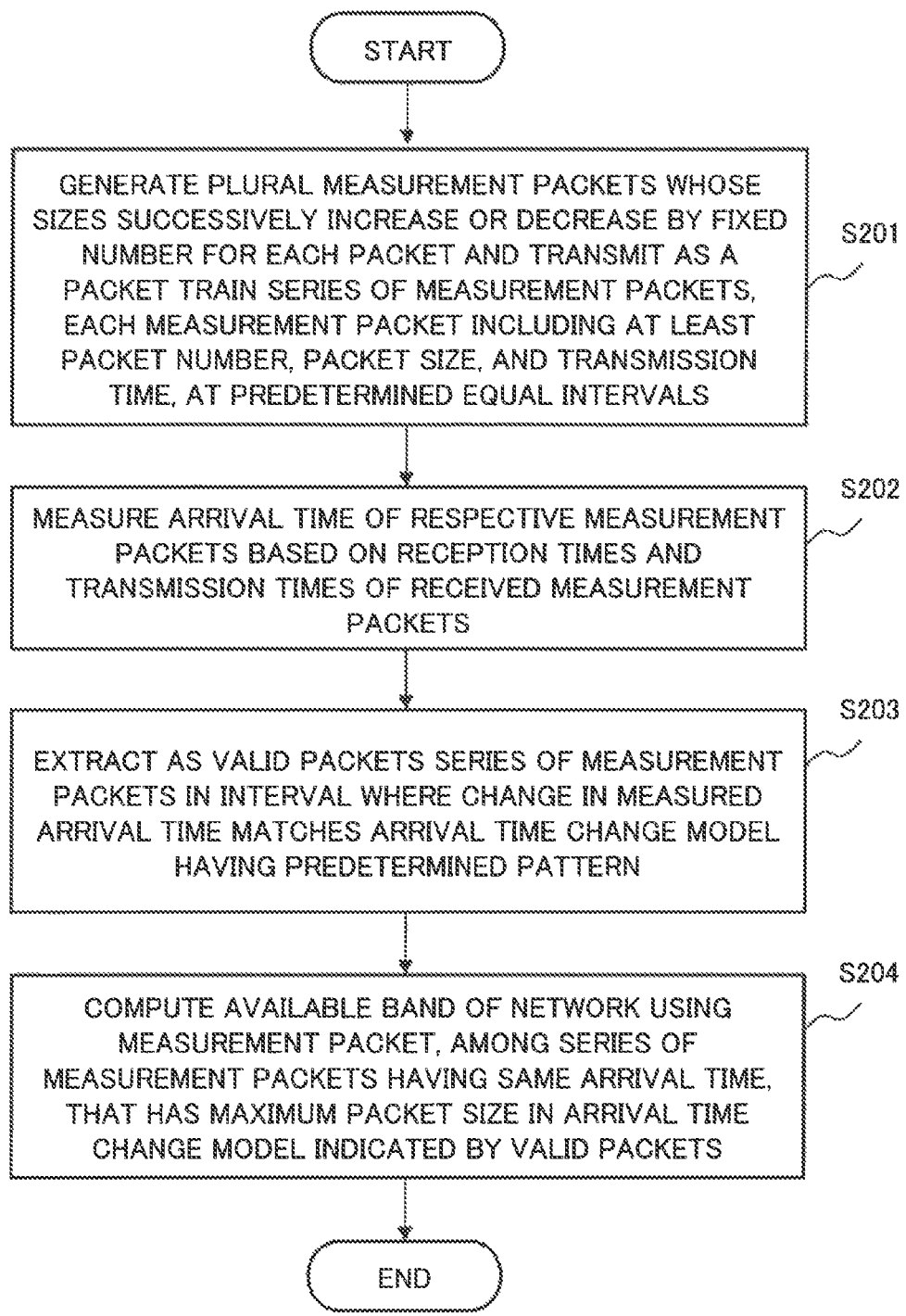
FIG. 5 is a flow diagram exemplifying operation of another network band measurement method according to the first example embodiment of the present invention.

FIG. 5 is a flow diagram exemplifying operation of another network band measurement method according to the first example embodiment of the present invention.

A plurality of measurement packets the packet sizes of which successively increase or decrease by a fixed number for each packet are generated, and a series of the measurement packets are transmitted as a packet train at predetermined equal intervals, each measurement packet including at least a packet number, a packet size, and a transmission time at which the measurement packet is transmitted to the network (S201).

Based on the reception times of measurement packets received from the network and the transmission times included in the received measurement packets, arrival time of the respective measurement packets constituting the packet train is measured (S202).

A series of measurement packets in an interval where change in the measured arrival time matches an arrival time change model having a predetermined pattern are extracted as valid packets (S203).

In the arrival time change model indicated by the valid packets, an available band of the network is computed using a measurement packet, among a series of measurement packets having the same arrival time, that has a maximum packet size (S204).

Figure 6:
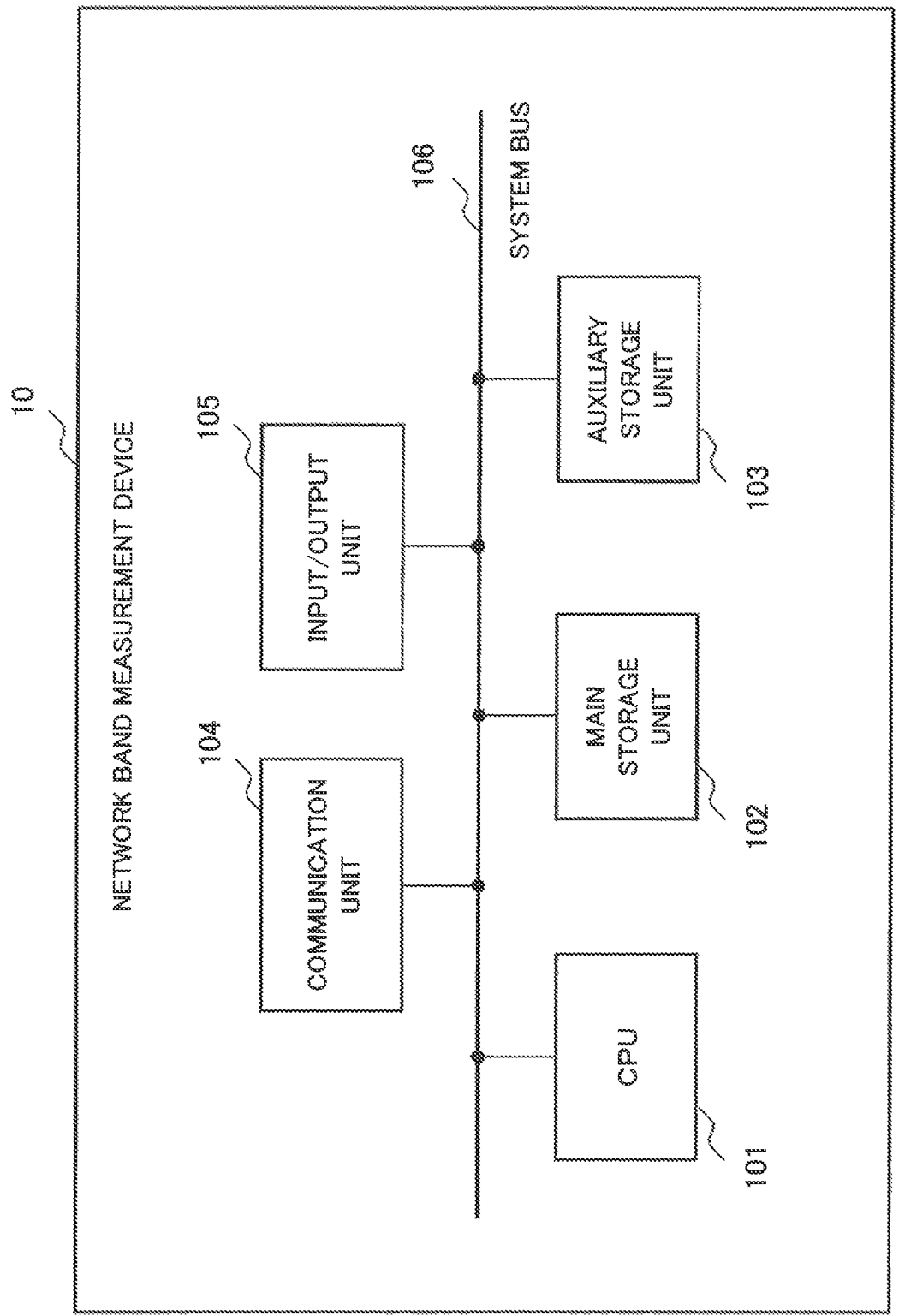
FIG. 6 is a block diagram exemplifying a hardware configuration of the network band measurement device according to the first example embodiment of the present invention.

FIG. 6 is a block diagram exemplifying a hardware configuration of the network band measurement device 10 according to the first example embodiment of the present invention.

With reference to FIG. 6, the network band measurement device 10 can be achieved by a hardware configuration similar to that of a general computer device and includes the following components.

The hardware configuration includes a central processing unit (CPU) 101, which is a control unit, a main storage unit 102, and an auxiliary storage unit 103. The main storage unit 102 is configured with a random access memory (RAM) and the like, and the auxiliary storage unit 103 is configured with a nonvolatile memory, such as a semiconductor memory.

The hardware configuration also includes a communication unit 104 that performs network communication, an input/output unit 105 as a man-machine interface, a system bus 106 that interconnects the components described above, and the like.

The network band measurement device 10 of the present example embodiment may also be achieved in a software manner by the CPU 101 executing a program providing respective functions of the respective components.

That is, the CPU 101 achieves the respective functions in a software manner by controlling the operation of the network band measurement device 10 through loading and executing a program stored in the auxiliary storage unit 103 in the main storage unit 102 or directly executing the program in the auxiliary storage unit 103.

Figure 7:
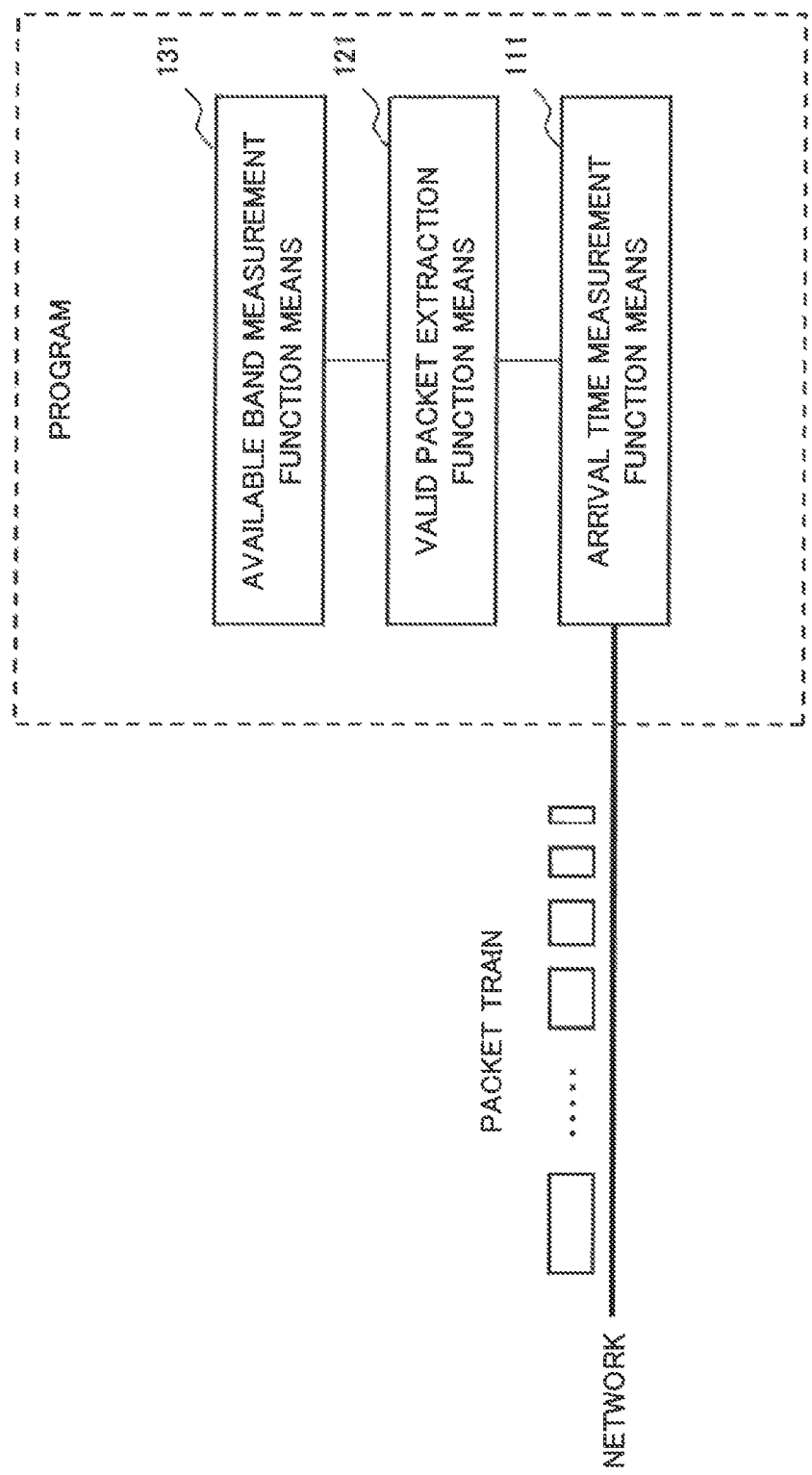
FIG. 7 is a block diagram exemplifying a configuration of function means that a program according to the first example embodiment of the present invention achieves.

FIG. 7 is a block diagram exemplifying a configuration of function means that a program according to the first example embodiment of the present invention achieves.

The program of the first example embodiment causes a computer to operate as an arrival time measurement function means 111, a valid packet extraction function means 121, and an available band measurement function means 131.

The arrival time measurement function means 111 receives transmitted measurement packets each of which includes at least a packet number, a packet size, and a transmission time from a network. A plurality of measurement packets are strung at predetermined equal intervals and thereby constitute a packet train, and the packet sizes of the measurement packets constituting the packet train successively increase or decrease by a fixed number for each packet. The arrival time measurement function means 111, based on reception times of the received measurement packets and the transmission times included in the received measurement packets, measures arrival time of the respective measurement packets constituting the packet train.

The valid packet extraction function means 121 extracts as valid packets a series of measurement packets in an interval where change in the measured arrival time matches an arrival time change model having a predetermined pattern.

The available band measurement function means 131, in the arrival time change model indicated by the valid packets, computes an available band of the network, using a measurement packet, among a series of measurement packets having the same arrival time, that has a maximum packet size.

Note that it is needless to say that the transmitting side device 110 constituting the network band measurement system 1 of the first example embodiment illustrated in FIG. 3 can also be achieved by the hardware configuration as exemplified in FIG. 6 and a program that the CPU executes.

The present example embodiment is configured to extract as valid packets a series of measurement packets in an interval where change in arrival time of respective measurement packets constituting a packet train matches an arrival time change model having a predetermined pattern.

This configuration, even in a network where delay occurs irregularly, enables only valid packets matching a desired arrival time change model to be extracted without being affected by change in arrival time caused by the irregular delay.

The present example embodiment is configured to, in the arrival time change model indicated by the valid packets, compute an available band of the network, using a measurement packet, among a series of measurement packets having the same arrival time, that has a maximum packet size. That is, when measurement packets the packet sizes of which successively increase by a fixed number for each packet are used, the packet size of a measurement packet immediately before the arrival time starts to increase is used. When measurement packets the packet sizes of which successively decrease by a fixed number for each packet are used, the packet size of a first measurement packet after the arrival time has become constant is used. An available band is computed by dividing the packet size of the target measurement packet by a transmission interval.

Therefore, in the present example embodiment, it is possible to compute an available band with high accuracy and by a simple configuration even in a network environment where delay irregularly occurs.

Second Example Embodiment

Next, with reference to FIGS. 8 to 14, a second example embodiment will be described.

Figure 8:
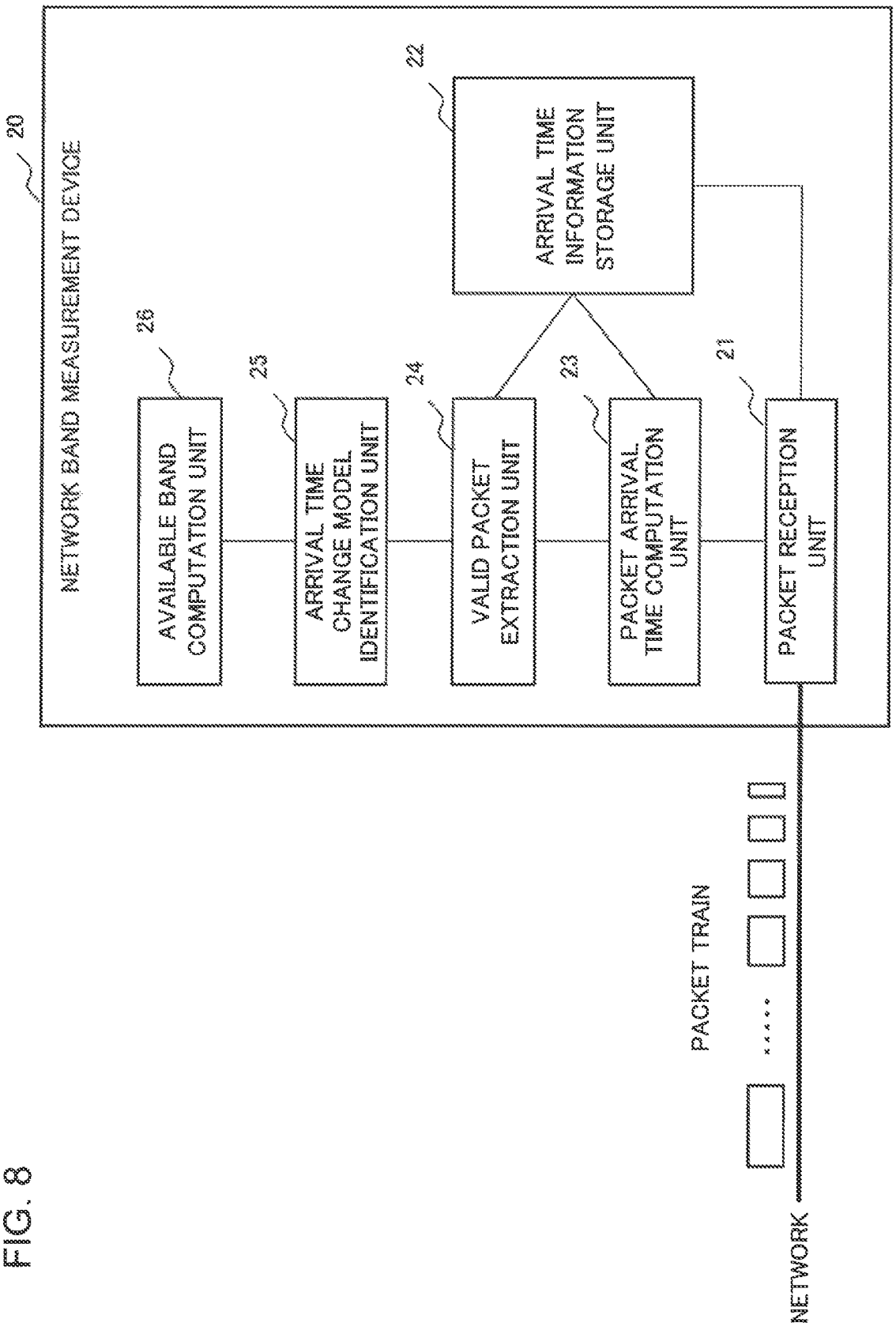
FIG. 8 is a block diagram exemplifying a configuration of a network band measurement device according to a second example embodiment of the present invention.

FIG. 8 is a block diagram exemplifying a configuration of a network band measurement device according to the second example embodiment of the present invention.

A network band measurement device 20 of the second example embodiment is required to be a device equipped with a function of exchanging information through communication with the outside, such as a mobile phone, a smart phone, a personal computer (PC), an on-vehicle terminal, and a gaming machine.

The network band measurement device 20 is configured to include a packet reception unit 21, an arrival time information storage unit 22, a packet arrival time computation unit 23, a valid packet extraction unit 24, an arrival time change model identification unit 25, and an available band computation unit 26. Functions of these function units constituting the network band measurement device 20 will be described later.

Figure 9:
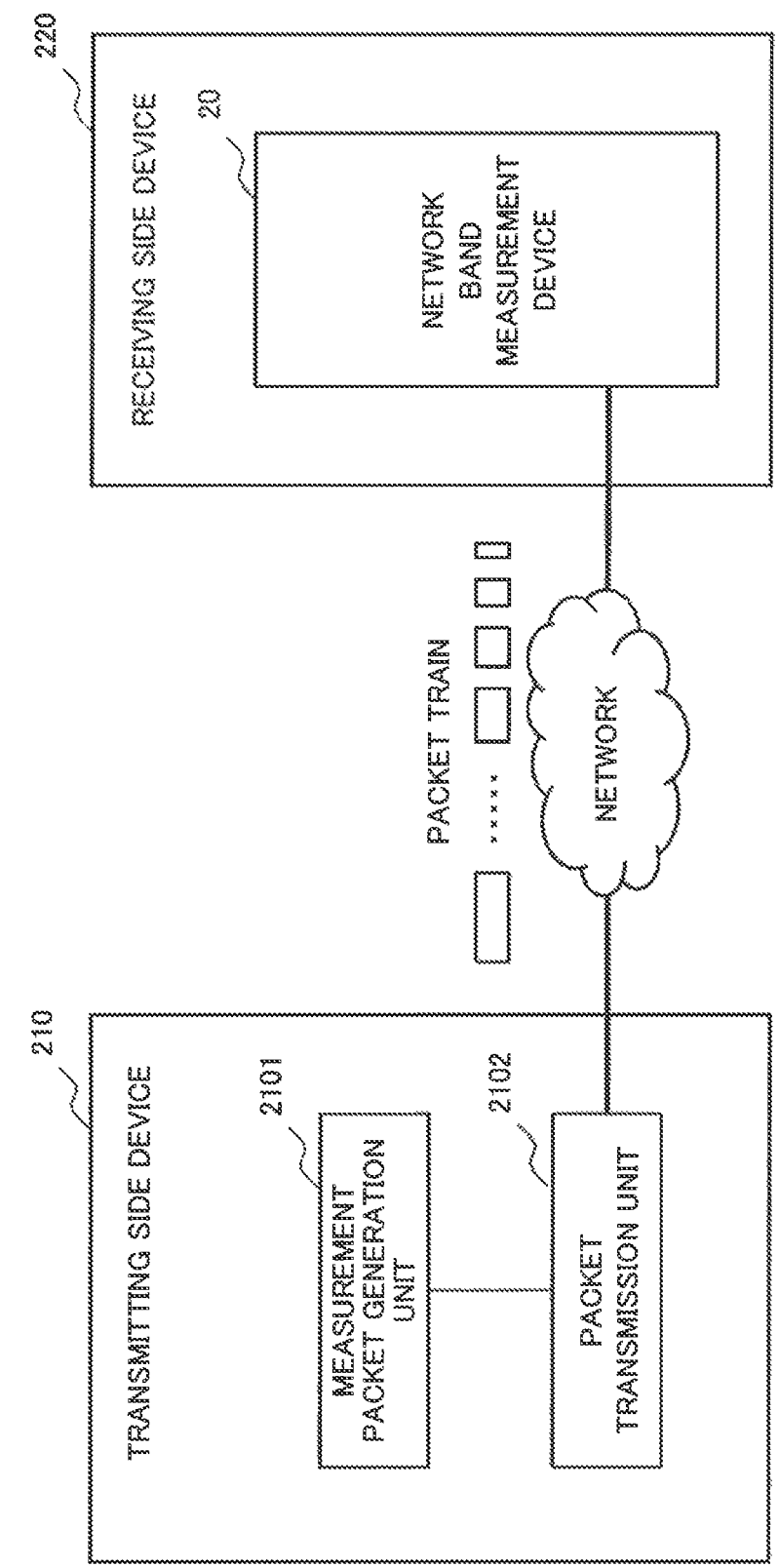
FIG. 9 is a block diagram exemplifying a configuration of a network band measurement system according to the second example embodiment of the present invention.

FIG. 9 is a block diagram exemplifying a configuration of a network band measurement system 2 according to the second example embodiment of the present invention in which the network band measurement device 20 is used as a receiving side device 220 and is connected to a transmitting side device 210 via a network. For the network band measurement system 2, a mode can be assumed in which, for example, the transmitting side device 210 is installed in a data aggregation center or the like, an available band of the network between the transmitting side device 210 and the receiving side device 220 is measured by the receiving side device 220, and a measurement result is transmitted to the data aggregation center.

The transmitting side device 210 is configured to include a measurement packet generation unit 2101 and a packet transmission unit 2102 that output a group of measurement packets to the network as a packet train.

The measurement packet generation unit 2101 generates and outputs a plurality of measurement packets that constitute a packet train and the packet sizes of which successively increase or decrease by a fixed number for each packet. Each measurement packet includes at least a packet number for identification of the measurement packet and a packet size indicating a size of the measurement packet. Each measurement packet may include number information indicating the number of measurement packets constituting the packet train. The number information may be included in all the measurement packets or only in the first and last packets.

The packet transmission unit 2102 arranges the respective measurement packets constituting the packet train in a time series at predetermined equal intervals and transmits the measurement packets to the network. That is, time intervals between transmission times of adjacent measurement packets are equal. The packet transmission unit 2102 includes a transmission time to the network in each measurement packet.

While, as a packet train, a plurality of measurement packets the packet sizes of which successively increase or decrease by a fixed number for each packet may be used, a case where a plurality of measurement packets the packet sizes of which successively increase by a fixed number for each packet are used as a packet train will be described unless otherwise stated in the following description.

A minimum packet size, a packet increment size, and the number of measurement packets constituting a packet train are set in such a way that a packet size of a measurement packet constituting the last packet falls within a packet size enabling packets having the packet size to pass through the network. That is, all packet sizes of the respective measurement packets constituting the packet train are set at packet sizes enabling packets having the packet sizes to pass through the network and reach the receiving side device 220.

Note that a packet size of a measurement packet having a packet number 1 is equal to the minimum packet size. A packet size of a measurement packet having a packet number 2 is larger than the packet size of the measurement packet having the packet number 1 by the packet increment size. Thereafter, packet sizes of measurement packets increase by the packet increment size every time the packet number increases by one.

As respective measurement packets, for example, internet protocol (IP) packets, user datagram protocol (UDP) packets, real-time transport protocol (RTP) packets, or the like can be used.

Respective function units constituting the network band measurement device 20 illustrated in FIG. 8 will be described.

The packet reception unit 21 successively receives measurement packets constituting the packet train described above from the network and outputs reception times of the received measurement packets and transmission times, packet sizes, and packet numbers included in the received measurement packets. On this occasion, when number information indicating the number of measurement packets constituting the packet train is included in the measurement packets, the packet reception unit 21 recognizes the total number of measurement packets to be received.

The packet numbers, the packet sizes, the transmission times, and the reception times of the measurement packets that the packet reception unit 21 outputs are stored in the arrival time information storage unit 22 in association with the packet numbers.

FIG. 10 is a diagram exemplifying information stored in the arrival time information storage unit.

The arrival time information storage unit 22 first stores the packet number, the packet size, the transmission time, and the reception time of each measurement packet that the packet reception unit 21 outputs.

When the packet arrival time computation unit 23 is notified of storing of the information described above in the arrival time information storage unit 22 by the packet reception unit 21, the packet arrival time computation unit 23 computes arrival time of each measurement packet that is a difference between the transmission time and the reception time stored in the arrival time information storage unit 22. The packet arrival time computation unit 23 further computes a difference in the arrival time between each pair of adjacent measurement packets as arrival time change information. Note that the arrival time change information may be expressed as a rounded value within an acceptable error range. In the example illustrated in FIG. 10, each arrival time change is simply rounded to a nearest integer and is expressed by the integer.

With reference to FIG. 10, information of a packet train constituted by 110 measurement packets having packet numbers "1" to "110" is stored.

For example, arrival time values of the measurement packets having the packet number "1", the packet number "2", the packet number "3", and the packet number "4" are 4.02 sec., 5.11 sec., 2.03 sec., and 3.04 sec., respectively, and, thereafter, arrival time values of the measurement packets are 3.02 sec., 3.03 sec., and so on.

Arrival time differences between respective pairs of adjacent measurement packets are as follows: the arrival time of the measurement packet having the packet number "2" is 1.09 sec. longer than that of the measurement packet having the packet number "1"; the arrival time of the measurement packet having the packet number "3" is 3.08 sec. shorter than that of the measurement packet having the packet number "2"; and the arrival time of the measurement packet having the packet number "4" is 1.01 sec. longer than that of the measurement packet having the packet number "3". Changes in the arrival time of the measurement packets having the packet numbers "5" to "20" are approximately constant, such as 0.02 sec., 0.01 sec., . . . , and 0.03 sec. The arrival time of the measurement packets having the packet numbers "21" to "107" monotonically increases. Further, the arrival time of the measurement packets having the packet numbers "108" to "110" changes irregularly.

The packet reception unit 21, the arrival time information storage unit 22, and the packet arrival time computation unit 23 described above correspond to the arrival time measurement means 11 in the first example embodiment.

When the packet arrival time computation unit 23 finishes packet arrival time computation with respect to all the measurement packets constituting the packet train, the packet arrival time computation unit 23 notifies the valid packet extraction unit 24 accordingly.

The valid packet extraction unit 24 finds an arrival time change model to be used for computation of an available band, based on the arrival time change information stored in the arrival time information storage unit 22 and extracts a group of measurement packets constituting the arrival time change model as valid packets.

Figure 11:
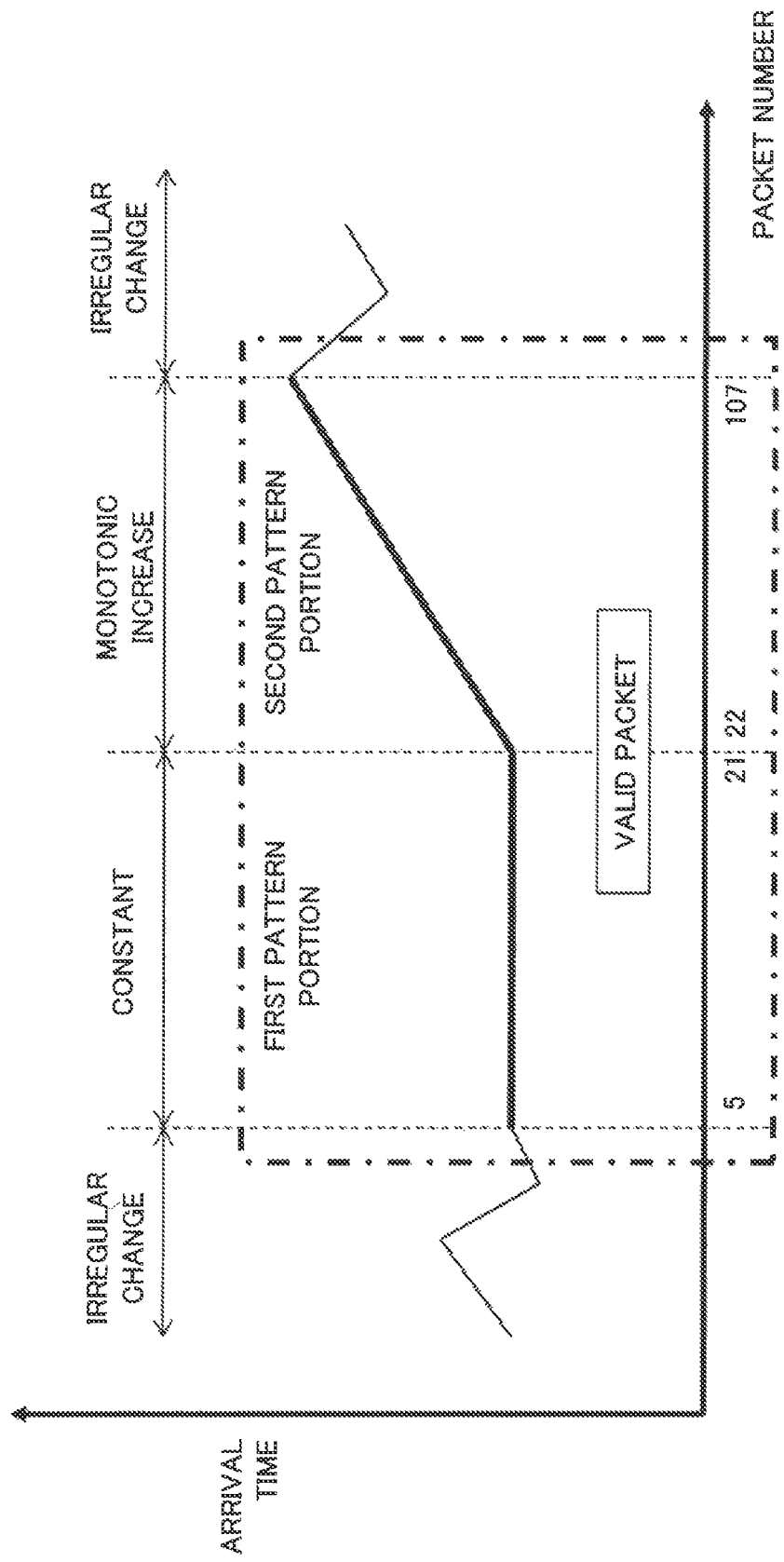
FIG. 11 is a diagram describing extraction of valid packets.

FIG. 11 is a diagram describing extraction of valid packets.

An arrival time change model has a constitution including a first pattern portion that is constituted by a series of measurement packets having the same arrival time and a second pattern portion that is constituted by a series of measurement packets the arrival time of which successively increases as the packet number increases.

That is, the valid packet extraction unit 24 refers to the arrival time change information stored in the arrival time information storage unit 22 in the order of packet numbers, identifies a series of measurement packets the arrival time change of which is equal to zero, and recognizes the series of measurement packets as the first pattern portion. For the recognition, it is required to have, as a requirement, a predetermined number of or more successive zeros.

In FIG. 11, a series of the measurement packets having the packet numbers "5" to "21" constitute the first pattern portion.

In addition, when the valid packet extraction unit 24 refers to the arrival time change information stored in the arrival time information storage unit 22 in the order of packet numbers, the valid packet extraction unit 24 recognizes a series of measurement packets the arrival time change of which is successive increases as the second pattern portion. For the recognition, it is required to have, as a requirement, a predetermined number of or more successive increases in the arrival time.

In FIG. 11, a series of the measurement packets having the packet numbers "22" to "107" constitute the second pattern portion.

In this way, the valid packet extraction unit 24, out of a series of the measurement packets having the packet numbers "1" to "110" constituting the packet train, extracts the measurement packets having the packet numbers "5" to "107" as valid packets. That is, the measurement packets having the packet numbers "1" to "4" and the measurement packets having the packet numbers "108" to "110" are excluded from measurement packets for computation of an available band as measurement packets the arrival time of which changed due to irregular delays.

The valid packets that the valid packet extraction unit 24 extracted are transmitted to the arrival time change model identification unit 25. On this occasion, the packet numbers, the transmission times, the arrival time change information, and the packet sizes with respect to measurement packets in each of the first pattern portion and the second pattern portion are transmitted to the arrival time change model identification unit 25.

The arrival time change model identification unit 25 identifies the type of an arrival time change model that the valid packets indicate.

The type of an arrival time change model refers to a model in which packet sizes of measurement packets constituting a packet train successively increase by a fixed number for each packet or a model in which packet sizes of the measurement packets successively decrease by a fixed number for each packet. Note that, although not described in the above description, when the model in which packet sizes of measurement packets successively decrease by a fixed number for each packet is used, the arrival time change model includes a third pattern portion that is constituted by a series of measurement packets the arrival time of which successively decreases as the packet number increases. Therefore, in this case, the packet numbers, the arrival time change information, and the packet sizes with respect to measurement packets in each of the first pattern portion and the third pattern portion are transmitted to the arrival time change model identification unit 25.

FIGS. 12A and 12B are diagrams describing arrival time change models.

The arrival time change model identification unit 25 identifies whether the arrival time change model that the valid packets indicate is an incremental arrival time change model or a decremental arrival time change model. The incremental arrival time change model is a model in which a first pattern portion changes to a second pattern portion as illustrated in FIG. 12A, and the decremental arrival time change model is a model in which a third pattern portion changes to a first pattern portion as illustrated in FIG. 12B. The arrival time change model identification unit 25 identifies a first pattern portion, a second pattern portion, and a third pattern portion and the packet numbers of packets belonging to the respective pattern portions from the packet numbers and the arrival time change information of the valid packets that the valid packet extraction unit 24 extracted.

When the arrival time change model that the valid packets indicate is an incremental arrival time change model, the arrival time change model identification unit 25 determines a measurement packet having the last packet number among a series of measurement packets constituting the first pattern portion as a packet used for computation of an available band. That is, as illustrated in FIG. 12A, a measurement packet "A" that is the last packet in the first pattern portion and is a packet immediately before the first pattern portion changes to the second pattern portion is determined as a packet used for the computation of an available band.

When the arrival time change model that the valid packets indicate is a decremental arrival time change model, the arrival time change model identification unit 25 determines a measurement packet having the first packet number among a series of measurement packets constituting the first pattern portion as a packet used for computation of an available band. That is, as illustrated in FIG. 12B, a measurement packet "B" that is the first packet in the first pattern portion and is a packet immediately after the third pattern portion changes to the first pattern portion is determined as a packet used for the computation of an available band.

The arrival time change model identification unit 25 notifies the available band computation unit 26 of the packet size of the measurement packet "A" or the measurement packet "B", which is determined as a packet used for the computation of an available band. Note that, on this occasion, the available band computation unit 26 is also notified of information on a transmission interval based on the transmission times of adjacent measurement packets.

The valid packet extraction unit 24 and the arrival time change model identification unit 25 described above correspond to the valid packet extraction means 12 in the first example embodiment.

The available band computation unit 26 computes an available band of the network, using the packet size of the measurement packet "A" or the measurement packet "B" and the information on the transmission interval, of which the available band computation unit 26 was notified by the arrival time change model identification unit 25. That is, an available band is computed by dividing the packet size of the target measurement packet by the transmission interval.

Note that, although not illustrated in FIG. 8, a measurement data storage unit that accumulates available band information that the available band computation unit 26 measured may be included in the network band measurement device 20. The available band information, which has been accumulated in the measurement data storage unit, is required to be transmitted to the data aggregation center as appropriate.

Next, operation of a network band measurement method of the second example embodiment will be described.

FIG. 13 is a flow diagram exemplifying the operation of the network band measurement method according to the second example embodiment of the present invention.

First, each measurement packet constituting a packet train is received from the network, and a reception time of the measurement packet is set (S301).

Note that the packet train is constituted by a plurality of measurement packets the packet sizes of which successively increase or decrease by a fixed number for each packet and the respective measurement packets are transmitted at predetermined equal intervals. In addition, each measurement packet includes at least a packet number, a packet size, and a transmission time. Further, number information indicating the number of measurement packets constituting the packet train may be included.

With respect to each measurement packet, the reception time and the transmission time, the packet size, and the packet number included in the measurement packet are extracted and data on arrival time and the like are stored (S302).

The data on arrival time and the like include arrival time of the measurement packet that is a difference between the transmission time and the reception time and arrival time change information that indicates a difference in the arrival time between adjacent measurement packets. That is, in step S302, the packet size, the transmission time, the reception time, the arrival time, and the arrival time change information of each measurement packet are stored in association with the packet number.

When the processing in step S302 is finished with respect to a received measurement packet, whether or not all the measurement packets constituting the packet train have been received is confirmed (S303).

When a measurement packet constituting the packet train is left unprocessed (No in S303), the process returns to step S301 and the reception processing of the measurement packet and the storage processing of the various types of information in step S302 are repeated.

When the data storage processing with respect to all the measurement packets constituting the packet train is finished (Yes in S303), valid packet extraction processing is performed (S304).

In the valid packet extraction processing, an arrival time change model to be used for computation of an available band is found based on the stored arrival time change information and a group of measurement packets constituting the arrival time change model are extracted as valid packets.

As described above, an arrival time change model includes a first pattern portion that is constituted by a series of measurement packets having the same arrival time and a second pattern portion that is constituted by a series of measurement packets the arrival time of which successively increases as the packet number increases. In addition, when a model in which the packet sizes of the measurement packets successively decrease by a fixed number for each packet is used, an arrival time change model includes a third pattern portion that is constituted by a series of measurement packets the arrival time of which successively decreases as the packet number increases.

With respect to the respective measurement packets in the valid packets extracted in the valid packet extraction processing, identification of an arrival time change model based on the packet numbers and the arrival time change information is performed (S305).

That is, whether the arrival time change model that the valid packets indicate is an incremental arrival time change model as illustrated in FIG. 12A or a decremental arrival time change model as illustrated in FIG. 12B is identified. The incremental arrival time change model is constituted by a first pattern portion and a second pattern portion, and the decremental arrival time change model is constituted by a third pattern portion and a first pattern portion.

When the arrival time change model that the valid packets indicate is an incremental arrival time change model, a measurement packet having the last packet number among a series of measurement packets constituting the first pattern portion is determined as a packet used for the computation of an available band.

When the arrival time change model that the valid packets indicate is a decremental arrival time change model, a measurement packet having the first packet number among a series of measurement packets constituting the first pattern portion is determined as a packet used for the computation of an available band.

Using the packet size of the measurement packet determined to be used for the computation of an available band, an available band of the network is computed (S306). That is, the available band is computed by dividing the packet size of the target measurement packet by a transmission interval based on the transmission times of adjacent measurement packets.

Note that each of the functions of the respective function units constituting the network band measurement device 20 can be achieved by, in a general computer device having a hardware configuration as exemplified in FIG. 6, the computer operating in accordance with a predetermined program.

Figure 14:
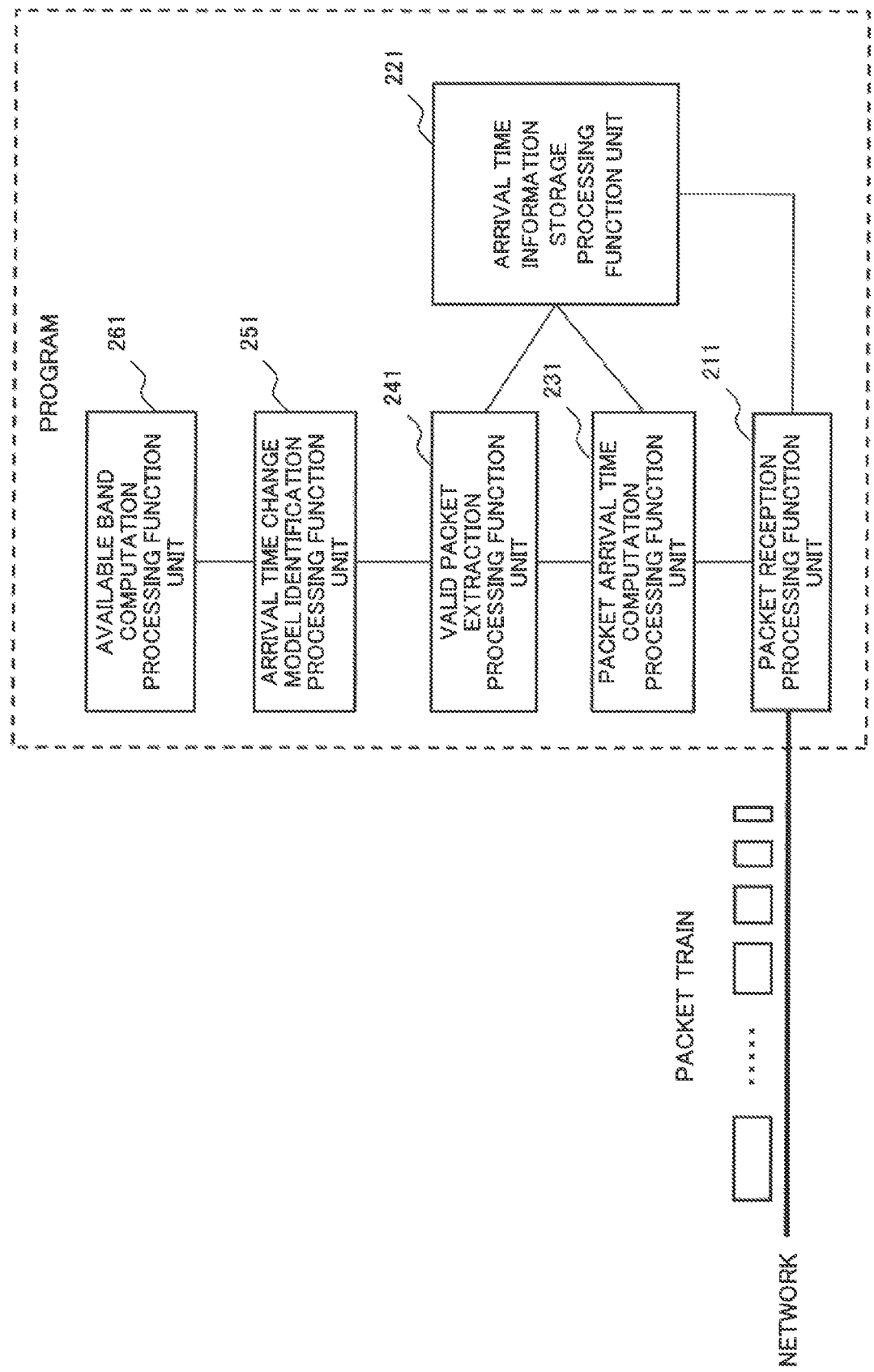
FIG. 14 is a block diagram exemplifying a configuration of function means that a program according to the second example embodiment of the present invention achieves.

FIG. 14 is a block diagram exemplifying a configuration of function means that a program according to the second example embodiment of the present invention achieves.

The program of the second example embodiment includes a packet reception processing function unit 211, an arrival time information storage processing function unit 221, a packet arrival time computation processing function unit 231, a valid packet extraction processing function unit 241, and an arrival time change model identification processing function unit 251. Further, the program is configured to include an available band computation processing function unit 261.

The respective processing function units are units that achieve the functions of the respective function units constituting the network band measurement device 20, described with reference to FIG. 8, in a software manner.

That is, the packet reception processing function unit 211 and the arrival time information storage processing function unit 221 achieve the functions of the packet reception unit 21 and the arrival time information storage unit 22, respectively. The packet arrival time computation processing function unit 231 and the valid packet extraction processing function unit 241 achieve the functions of the packet arrival time computation unit 23 and the valid packet extraction unit 24, respectively. The arrival time change model identification processing function unit 251 and the available band computation processing function unit 261 achieve the functions of the arrival time change model identification unit 25 and the available band computation unit 26, respectively.

The present example embodiment is configured to determine whether change in arrival time of respective measurement packets constituting a packet train matches an incremental arrival time change model or a decremental arrival time change model and extract as valid packets a series of measurement packets in an interval where the change in the arrival time matches the determined arrival time change model.

This configuration, even in a network where delay occurs irregularly, enables only valid packets matching a desired arrival time change model to be extracted without being affected by change in the arrival time due to the irregular delay.

When the arrival time change model that the extracted valid packets indicate is an incremental arrival time change model, a measurement packet having the last packet number among a series of measurement packets constituting a first pattern portion in which change in the arrival time is zero is used for computation of an available band. This is because the measurement packet is a packet immediately before a second pattern portion in which change in the arrival time is successive increases and a measurement packet having a maximum packet size among a series of measurement packets constituting the first pattern portion.

When the arrival time change model that the valid packets indicate is a decremental arrival time change model, a measurement packet having the first packet number among a series of measurement packets constituting the first pattern portion is used for computation of an available band. This is because the measurement packet is a packet immediately after a third pattern portion in which change in the arrival time is successive decreases and a measurement packet having a maximum packet size among a series of measurement packets constituting the first pattern portion.

The available band is computed by dividing the packet size of the target measurement packet by a transmission interval.

Therefore, in the present example embodiment, it is possible to compute an available band with high accuracy and by a simple configuration even in a network environment where delay irregularly occurs.

Third Example Embodiment

Next, with reference to FIGS. 15 to 18, a third example embodiment will be described.

Figure 15:
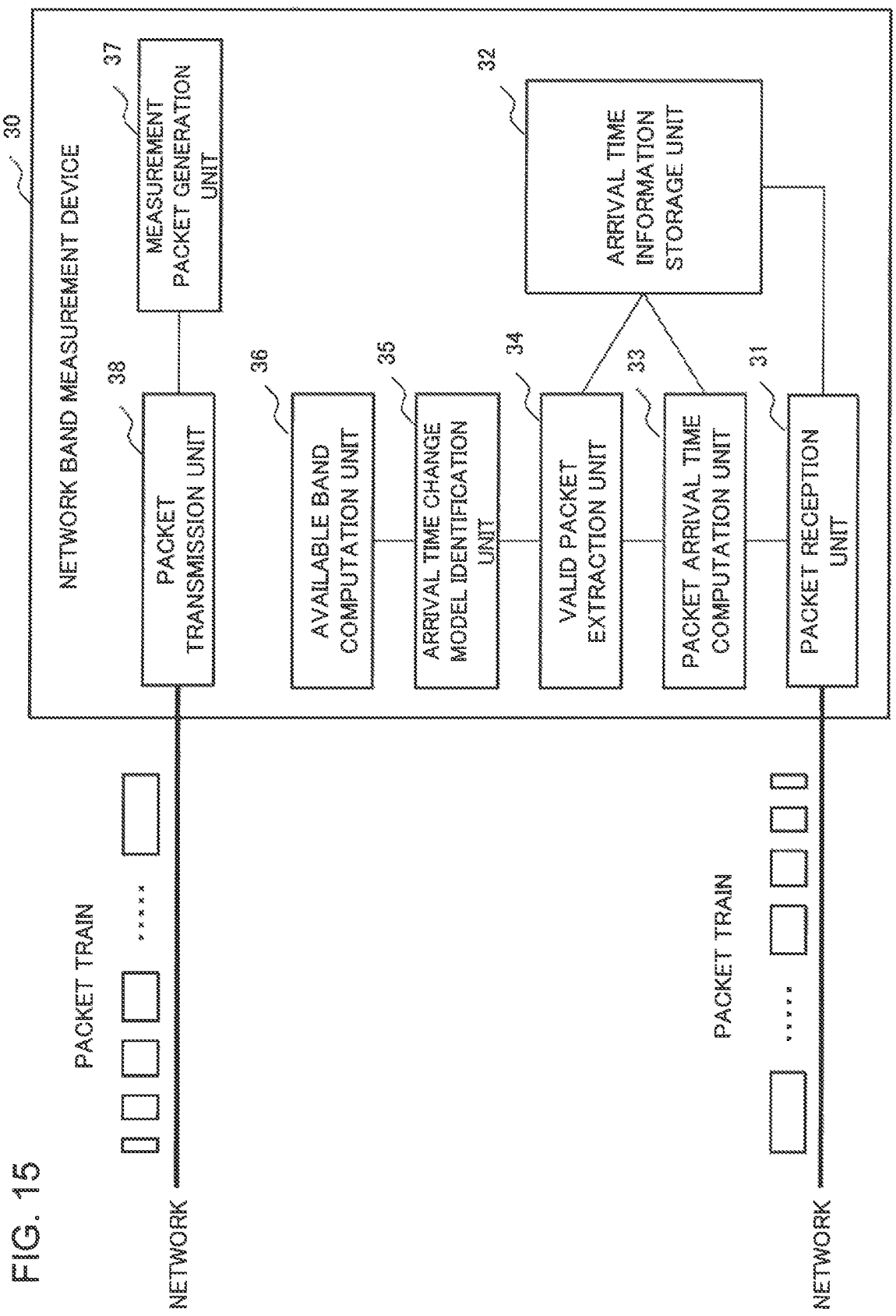
FIG. 15 is a block diagram exemplifying a configuration of a network band measurement device according to a third example embodiment of the present invention.

FIG. 15 is a block diagram exemplifying a configuration of a network band measurement device according to the third example embodiment of the present invention.

A network band measurement device 30 of the third example embodiment is, as with the network band measurement device 20 of the second example embodiment, required to be a device equipped with a function of exchanging information through communication with the outside.

The network band measurement device 30 includes a packet reception unit 31, an arrival time information storage unit 32, a packet arrival time computation unit 33, a valid packet extraction unit 34, an arrival time change model identification unit 35, and an available band computation unit 36. Further, the network band measurement device 30 is configured to include a measurement packet generation unit 37 and a packet transmission unit 38.

That is, the network band measurement device 30 has a configuration in which, to the network band measurement device 20 of the second example embodiment, the measurement packet generation unit 2101 and the packet transmission unit 2102 of the transmitting side device 210, described with reference to FIG. 9, are added.

Each of the packet reception unit 31, the arrival time information storage unit 32, the packet arrival time computation unit 33, the valid packet extraction unit 34, the arrival time change model identification unit 35, and the available band computation unit 36 has the same function as a corresponding function unit of the network band measurement device 20. That is, the packet reception unit 31 and the arrival time information storage unit 32 have the same functions as the packet reception unit 21 and the arrival time information storage unit 22, respectively. The packet arrival time computation unit 33 and the valid packet extraction unit 34 have the same functions as the packet arrival time computation unit 23 and the valid packet extraction unit 24, respectively. The arrival time change model identification unit 35 and the available band computation unit 36 have the same functions as the arrival time change model identification unit 25 and the available band computation unit 26, respectively.

The measurement packet generation unit 37 and the packet transmission unit 38 correspond to the measurement packet generation unit 2101 and the packet transmission unit 2102 of the transmitting side device 210, described with reference to FIG. 9, respectively, and the respective function units have the same functions as corresponding function units.

A packet train used in the present example embodiment is a plurality of measurement packets having the same constitution as the measurement packets in the packet train used in the second example embodiment.

The measurement packet generation unit 37 generates and outputs a plurality of measurement packets that constitute a packet train and the packet sizes of which successively increase or decrease by a fixed number for each packet. Each measurement packet includes at least a packet number for identification of the measurement packet and a packet size indicating a size of the measurement packet. In addition, number information indicating the number of measurement packets constituting the packet train may be included.

The packet transmission unit 38 arranges the respective measurement packets constituting the packet train in a time series at predetermined equal intervals and transmits the measurement packets to the network. That is, time intervals between transmission times of adjacent measurement packets are equal. The packet transmission unit 38 includes a transmission time to the network in each measurement packet.

Figure 16:
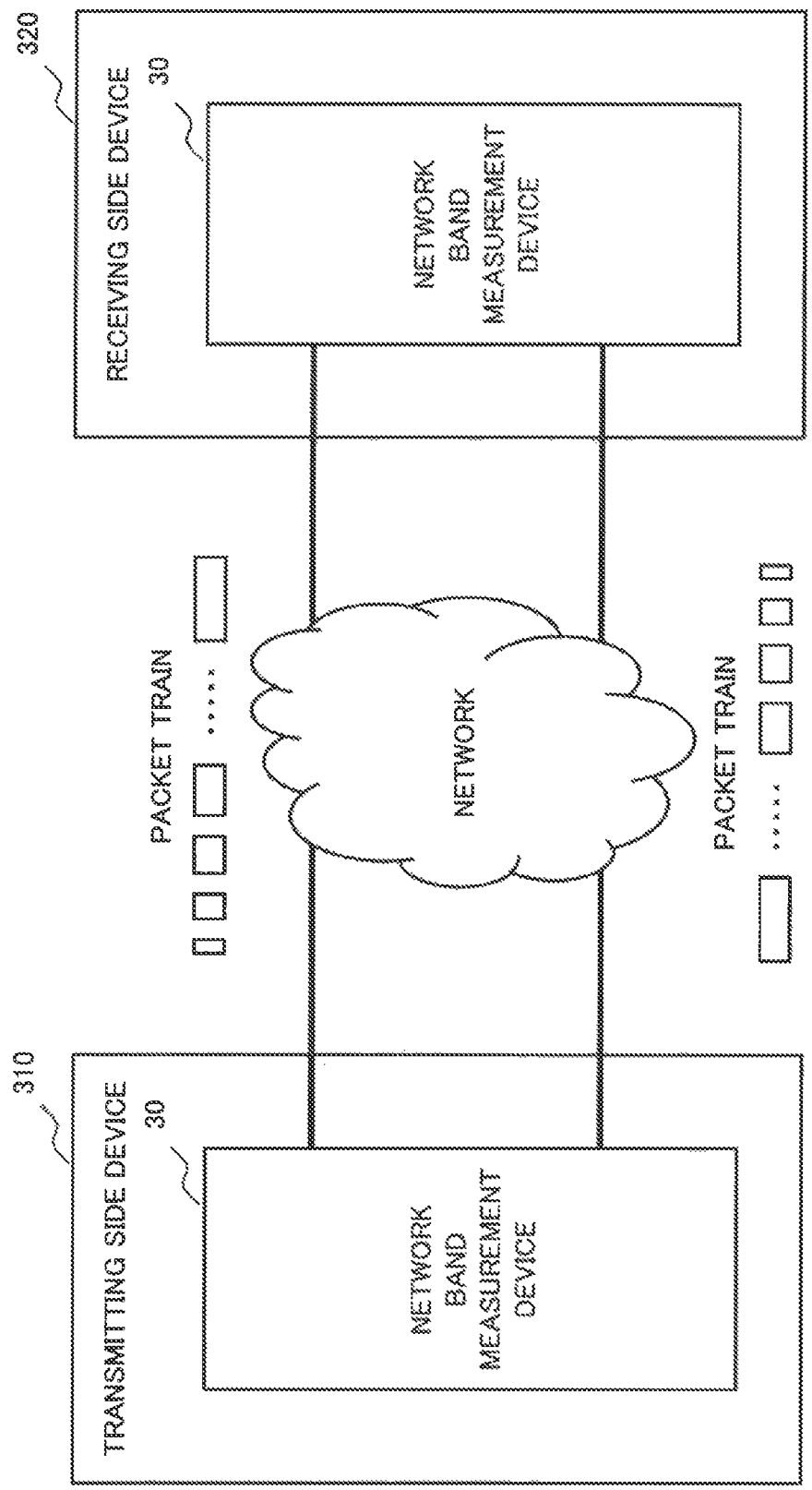
FIG. 16 is a block diagram exemplifying a configuration of a network band measurement system according to the third example embodiment of the present invention.

FIG. 16 is a block diagram exemplifying a configuration of a network band measurement system according to the third example embodiment of the present invention in which the network band measurement devices 30 are used as a transmitting side device 310 and a receiving side device 320, which are interconnected via a network.

In a network band measurement system 3, the packet transmission unit 38 in the network band measurement device 30 of the transmitting side device 310 is connected to the packet reception unit 31 in the network band measurement device 30 of the receiving side device 320. The packet transmission unit 38 in the network band measurement device 30 of the receiving side device 320 is connected to the packet reception unit 31 in the network band measurement device 30 of the transmitting side device 310.

In this manner, the network band measurement system 3 of the present example embodiment is configured to measure both an available band in the downstream direction, directed from the transmitting side device 310 to the receiving side device 320, and an available band in the upstream direction, directed from the receiving side device 320 to the transmitting side device 310.

In the network band measurement system 3, for example, the transmitting side device 310 is assumed to be installed and used at a site adjacent to an area that works as a black box in the network. That is, the network band measurement system 3 may be configured in such a way as to sandwich such a black box section between the transmitting side device 310 and the receiving side device 320, measure available bands in both directions in the black box section, and transmit a measurement result to a data aggregation center. Configuring the network band measurement system 3 in such a manner enables an available band of a black box section, in which corporations and carriers providing network services are not involved, to be observed from the outside and existence of a bottleneck serving as a deterioration factor in a service use feeling to be identified.

In this case, it may be configured such that the receiving side device 320 is notified of information on an available band in the upstream direction that the transmitting side device 310 measured and a measurement result of available bands in both the upstream and downstream directions are transmitted from the receiving side device 320 to the data aggregation center.

Figure 17A:
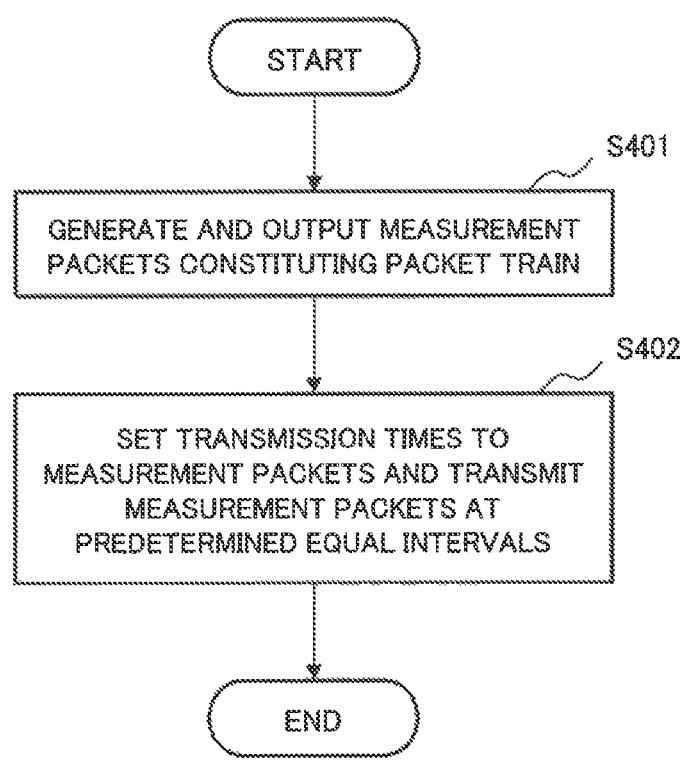
FIGS. 17A and 17B are flow diagrams exemplifying operation of a network band measurement method according to the third example embodiment of the present invention.
Figure 17B:
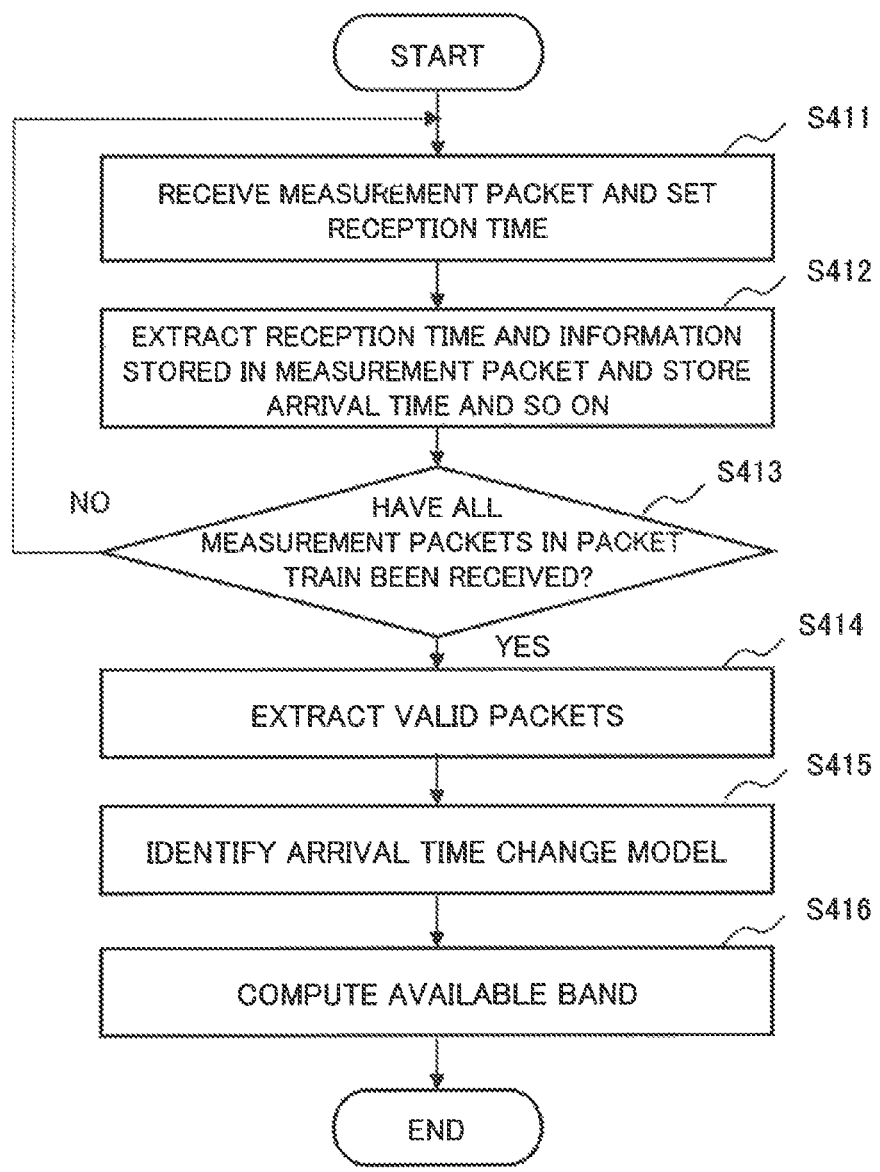

FIGS. 17A and 17B are flow diagrams exemplifying operation of a network band measurement method according to the third example embodiment of the present invention.

FIG. 17A illustrates an operation of transmitting a packet train.

A plurality of measurement packets that constitute a packet train and the packet sizes of which successively increase or decrease by a fixed number for each packet are generated and output (S401).

Each measurement packet includes at least a packet number for identification of the measurement packet and a packet size indicating a size of the measurement packet. In addition, number information indicating the number of measurement packets constituting the packet train may be included.

A transmission time to the network is set to each measurement packet constituting the packet train, and the measurement packets are arranged in a time series at predetermined equal intervals and transmitted to the network (S402).

FIG. 17B illustrates an operation of receiving a packet train and measuring an available band. Since operation from steps S411 to S416 is the same as the operation from steps S301 to S306 described with reference to FIG. 13, a description thereof will be omitted.

Each of the functions of the respective function units constituting the network band measurement device 30 can be achieved by, in a general computer device having a hardware configuration as exemplified in FIG. 6, the computer operating in accordance with a predetermined program.

Figure 18:
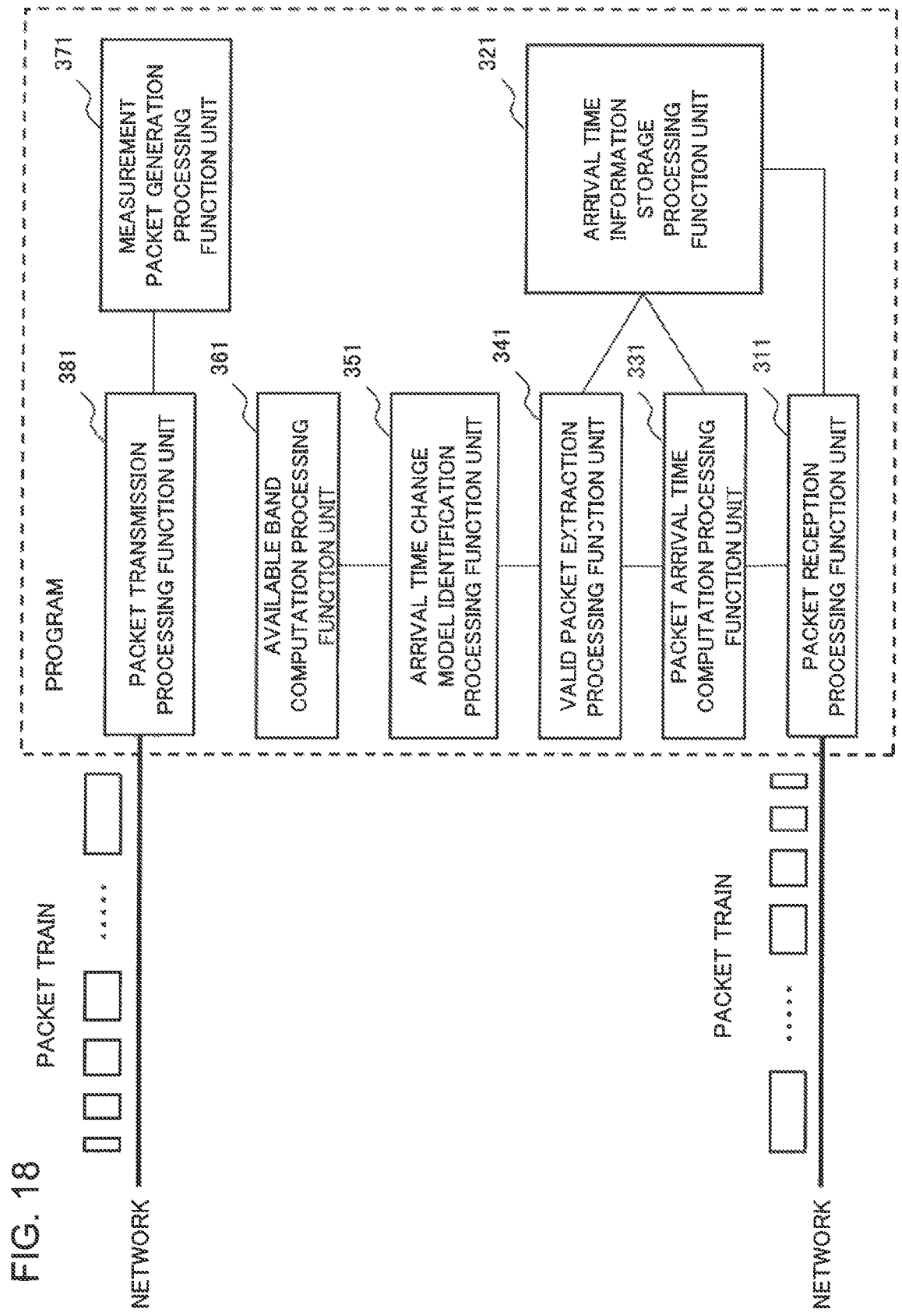
FIG. 18 is a block diagram exemplifying a configuration of function means that a program according to the third example embodiment of the present invention achieves.

FIG. 18 is a block diagram exemplifying a configuration of function means that a program according to the third example embodiment of the present invention achieves.

The program of the third example embodiment includes a packet reception processing function unit 311, an arrival time information storage processing function unit 321, a packet arrival time computation processing function unit 331, a valid packet extraction processing function unit 341, and an arrival time change model identification processing function unit 351. Further, the program is configured to include an available band computation processing function unit 361 and therewith a measurement packet generation processing function unit 371 and a packet transmission processing function unit 381.

The respective processing function units are units that achieve the functions of the respective function units constituting the network band measurement device 30, described with reference to FIG. 15, in a software manner.

That is, the packet reception processing function unit 311 and the arrival time information storage processing function unit 321 achieve the functions of the packet reception unit 31 and the arrival time information storage unit 32, respectively. The packet arrival time computation processing function unit 331 and the valid packet extraction processing function unit 341 achieve the functions of the packet arrival time computation unit 33 and the valid packet extraction unit 34, respectively. The arrival time change model identification processing function unit 351 and the available band computation processing function unit 361 achieve the functions of the arrival time change model identification unit 35 and the available band computation unit 36, respectively. Further, the measurement packet generation processing function unit 371 and the packet transmission processing function unit 381 achieve the functions of the measurement packet generation unit 37 and the packet transmission unit 38, respectively.

The present example embodiment is configured to measure available bands in both the upstream and downstream directions between the transmitting side device 310 and the receiving side device 320. The other part of the configuration is the same as that of the second example embodiment.

Measurement of available bands in both the upstream and downstream directions between the transmitting side device 310 and the receiving side device 320, for example, enables an available band of a black box section to be observed from the outside and existence of a bottleneck serving as a deterioration factor in a service use feeling to be identified.

The present example embodiment is also configured to extract as valid packets a series of measurement packets in an interval where change in arrival time matches an arrival time change model in accordance with change in the arrival time of respective measurement packets constituting a packet train.

This configuration, even in a network where delay occurs irregularly, enables only valid packets matching a desired arrival time change model to be extracted without being affected by change in arrival time due to the irregular delay.

A measurement packet to be used for computation of an available band is identified in accordance with an arrival time change model that the extracted valid packets indicate, and the available band is computed by dividing the packet size of the identified measurement packet by a transmission interval.

Therefore, in the present example embodiment, it is also possible to compute an available band with high accuracy and by a simple configuration even in a network environment where delay irregularly occurs.

Fourth Example Embodiment

Next, with reference to FIGS. 19 to 22, a fourth example embodiment will be described.

Figure 19:
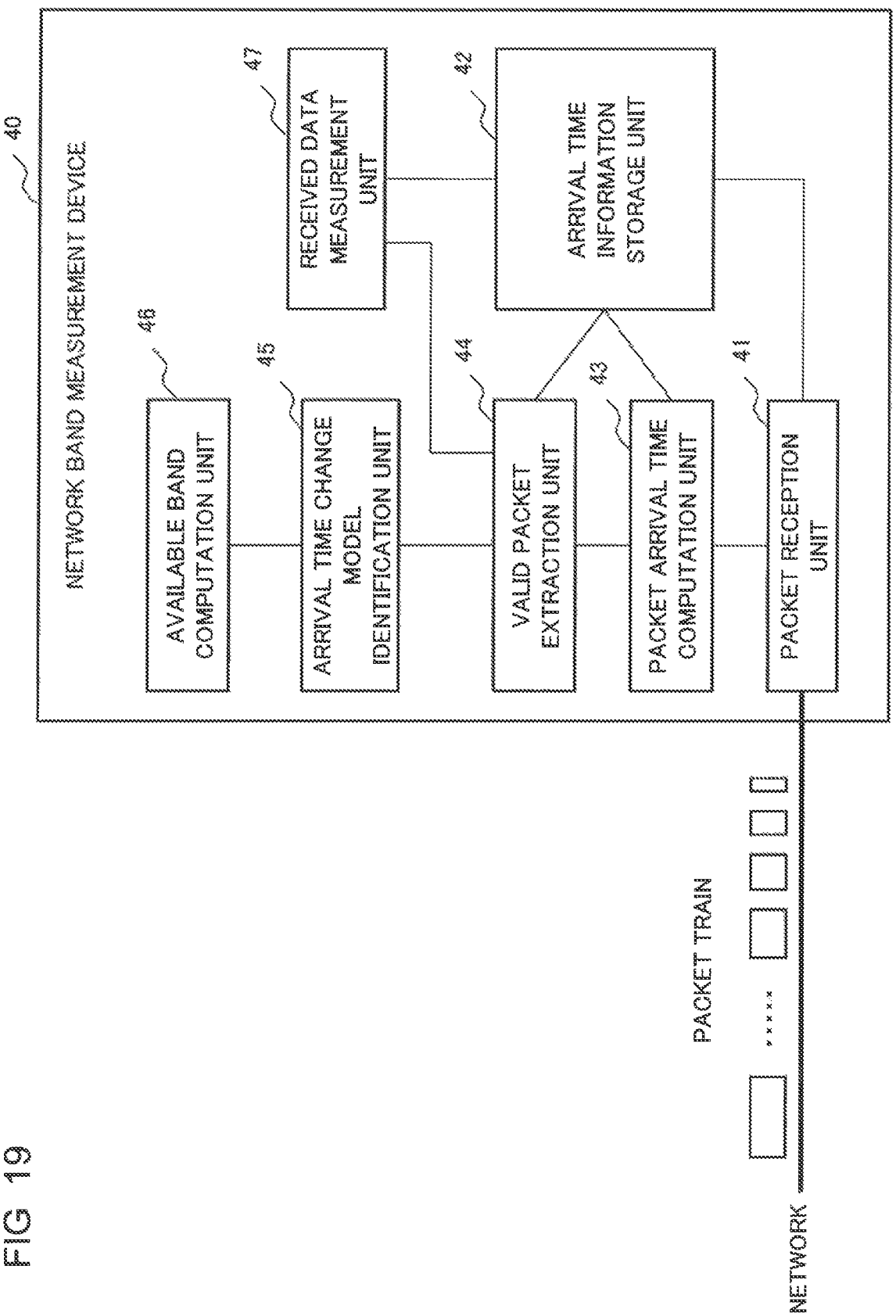
FIG. 19 is a block diagram exemplifying a configuration of a network band measurement device according to a fourth example embodiment of the present invention.

FIG. 19 is a block diagram exemplifying a configuration of a network band measurement device according to the fourth example embodiment of the present invention.

A network band measurement device 40 of the fourth example embodiment is, as with the network band measurement device 20 of the second example embodiment, required to be a device equipped with a function of exchanging information through communication with the outside.

The network band measurement device 40 of the fourth example embodiment has a configuration in which, to the network band measurement device 20 of the second example embodiment, described with reference to FIG. 8, a received data measurement unit 47 is added.

Of function units of the network band measurement device 40, each of a packet reception unit 41, an arrival time information storage unit 42, a packet arrival time computation unit 43, an arrival time change model identification unit 45, and an available band computation unit 46 has the same function as a corresponding function unit of the network band measurement device 20.

That is, the packet reception unit 41 and the arrival time information storage unit 42 have the same functions as the packet reception unit 21 and the arrival time information storage unit 22, respectively. The packet arrival time computation unit 43, the arrival time change model identification unit 45, and the available band computation unit 46 have the same functions as the packet arrival time computation unit 23, the arrival time change model identification unit 25, and the available band computation unit 26, respectively.

On the other hand, the valid packet extraction unit 44 has a different function from the valid packet extraction unit 24 of the network band measurement device 20 in terms of performing control of instructing the received data measurement unit 47.

Figure 20:
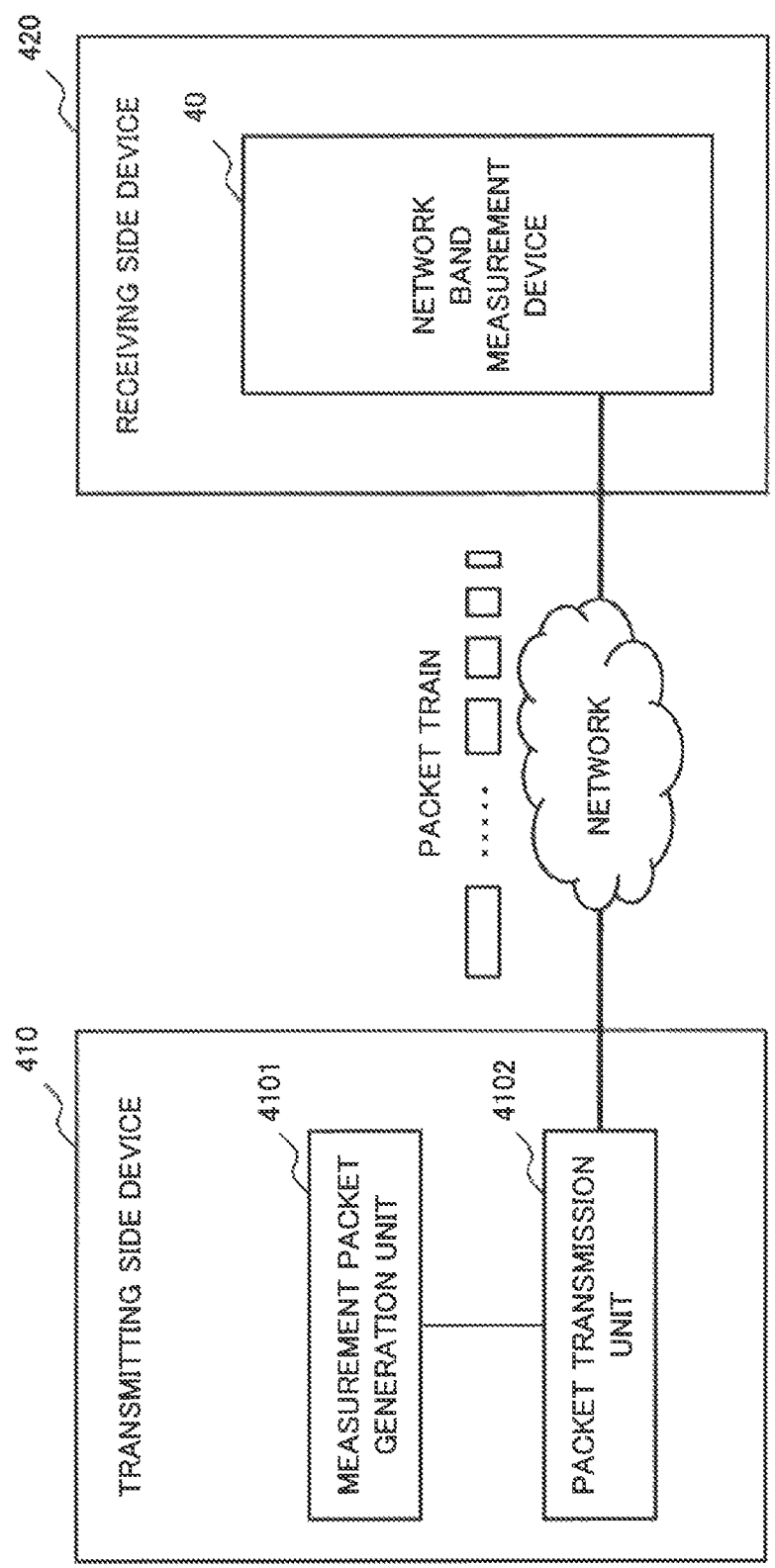
FIG. 20 is a block diagram exemplifying a configuration of a network band measurement system according to the fourth example embodiment of the present invention.

FIG. 20 is a block diagram exemplifying a configuration of a network band measurement system according to the fourth example embodiment of the present invention.

A network band measurement system 4 of the fourth example embodiment has a configuration similar to that of the network band measurement system 2 of the second example embodiment, described with reference to FIG. 9. That is, the network band measurement system 4 has a configuration in which the network band measurement device 40 is used as a receiving side device 420 and is connected to a transmitting side device 410 via a network. The transmitting side device 410 is configured to include a measurement packet generation unit 4101 and a packet transmission unit 4102 that output a group of measurement packets to the network as a packet train.

A function of each of the measurement packet generation unit 4101 and the packet transmission unit 4102 of the transmitting side device 410 is the same as the function of a corresponding one of the measurement packet generation unit 2101 and the packet transmission unit 2102 of the transmitting side device 210, described with reference to FIG. 9.

Functions different from those of the network band measurement device 20 of the second example embodiment will be described below.

The valid packet extraction unit 44 of the present example embodiment determines whether change in arrival time of respective measurement packets constituting a packet train matches an incremental arrival time change model or a decremental arrival time change model. The valid packet extraction unit 44 extracts as valid packets a series of measurement packets in an interval where change in arrival time matches the determined arrival time change model.

Further, when the valid packet extraction unit 44 cannot determine a series of measurement packets that match the determined arrival time change model, the valid packet extraction unit 44 instructs the received data measurement unit 47 to compute a data receiving speed of the received packet train.

That is, when the valid packet extraction unit 44 determines a series of measurement packets that match a predetermined arrival time change model, the valid packet extraction unit 44 extracts as valid packets a series of measurement packets in an interval where change in the arrival time matches the predetermined arrival time change model and performs measurement processing of an available band. On the other hand, when the valid packet extraction unit 44 cannot determine a series of measurement packets that match the predetermined arrival time change model, the valid packet extraction unit 44 performs measurement processing of a data receiving speed of the received packet train.

Such a configuration enables a data receiving speed of a received packet train to be measured even when valid packets that match a desired arrival time change model cannot be extracted due to significant influence from external disturbances.

When the received data measurement unit 47 receives an instruction to perform measurement of a data receiving speed from the valid packet extraction unit 44, the received data measurement unit 47 refers to stored information in the arrival time information storage unit 42.

The received data measurement unit 47, based on a difference between a reception time of the first measurement packet and a reception time of the last measurement packet and an integrated value of respective packet sizes of a series of measurement packets constituting the received packet train, computes a data receiving speed of the packet train. That is, a reception period taken to receive the series of measurement packets constituting the packet train is computed from a difference between the reception time of a packet having a packet number "1" and the reception time of a packet having a packet number "110" in information in the arrival time information storage unit described with reference to FIG. 10. An integrated value of the packet sizes of the respective packets having packet numbers "1" to "110" is computed as a received measurement packet amount. The data receiving speed is computed by dividing the received measurement packet amount by the reception period.

Figure 21:
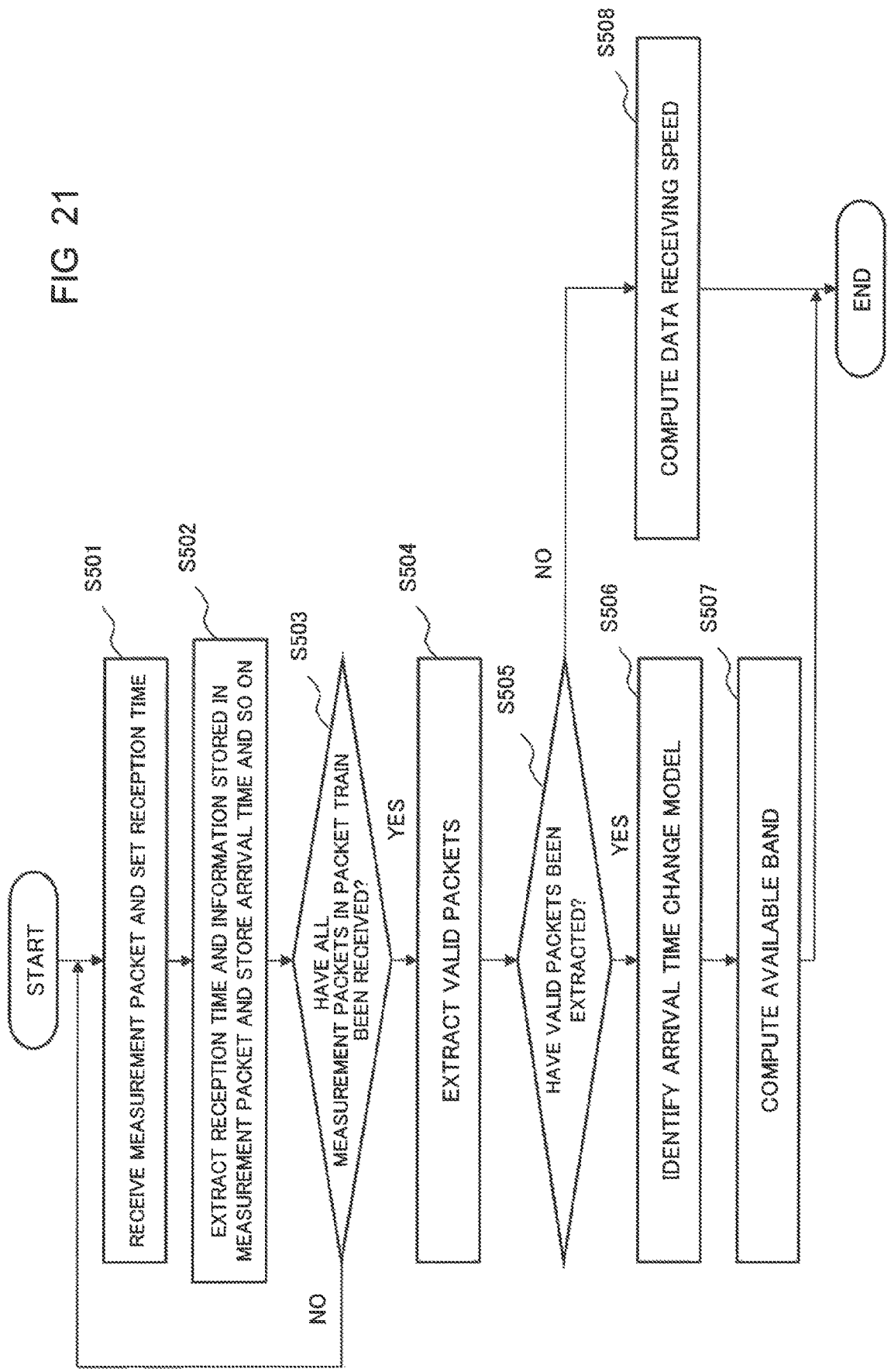
FIG. 21 is a flow diagram exemplifying operation of a network band measurement method according to the fourth example embodiment of the present invention.

FIG. 21 is a flow diagram exemplifying operation of a network band measurement method according to the fourth example embodiment of the present invention.

In the flow diagram in FIG. 21, since operation from steps S501 to S504 is the same as the operation from steps S301 to S304 in the operation of the network band measurement method of the second example embodiment, described with reference to FIG. 13, a description thereof will be omitted.

In valid packet extraction processing in step S504, an arrival time change model to be used for computation of an available band is found based on stored arrival time change information and a group of measurement packets constituting the arrival time change model are extracted as valid packets. However, valid packets that match a desired arrival time change model sometimes cannot be extracted due to significant influence from external disturbances.

Thus, in step S505, determination on whether or not sufficient valid packets have been extracted is performed.

When sufficient valid packets have not been extracted (No in S505), computation processing of a data receiving speed is performed.

As described above, the computation processing of a data receiving speed, based on a difference between the reception time of the first measurement packet and the reception time of the last measurement packet and an integrated value of the respective packet sizes of a series of measurement packets constituting a received packet train, computes a data receiving speed. That is, a reception period taken to receive the series of measurement packets constituting the packet train is computed from a difference between the reception time of a packet having a packet number "1" and the reception time of a packet having a packet number "110" in the information in the arrival time information storage unit 42. An integrated value of the packet sizes of the respective packets having packet numbers "1" to "110" is computed as a received measurement packet amount. The data receiving speed is computed by dividing the received measurement packet amount by the reception period.

On the other hand, in the flow diagram in FIG. 21, since operation after it is determined in step S505 that valid packets have been extracted (Yes in S505) is the same as the operation of the network band measurement method of the second example embodiment, described with reference to FIG. 13, a description thereof will be omitted. That is, operation in steps S506 and 507 is the same as the operation in steps S305 and S306 in the operation of the network band measurement method of the second example embodiment, described with reference to FIG. 13.

Note that each of the functions of the respective function units constituting the network band measurement device 40 can be achieved by, in a general computer device having a hardware configuration as exemplified in FIG. 6, the computer operating in accordance with a predetermined program.

Figure 22:
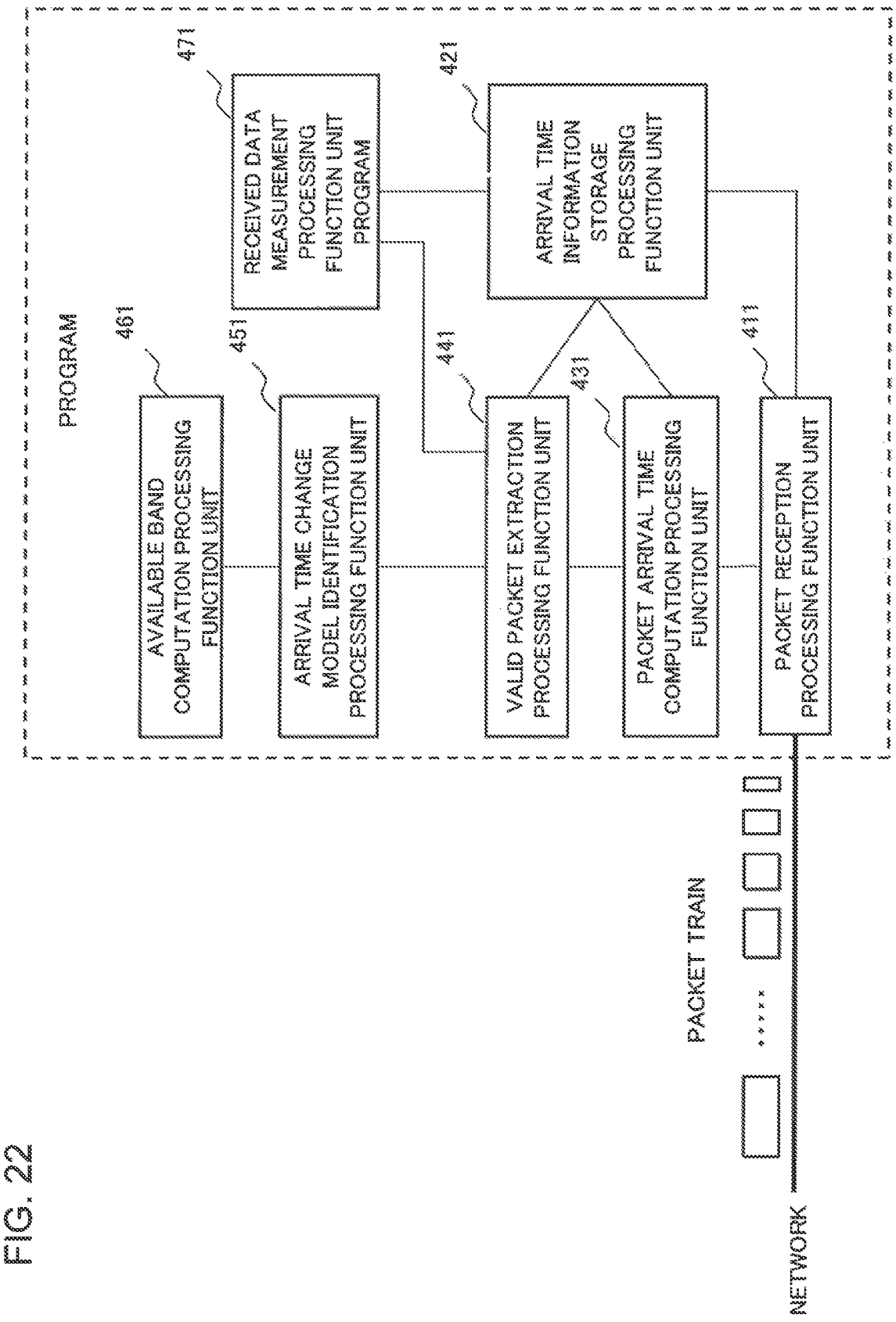
FIG. 22 is a block diagram exemplifying a configuration of function means that a program according to the fourth example embodiment of the present invention achieves.

FIG. 22 is a block diagram exemplifying a configuration of function means that a program according to the fourth example embodiment of the present invention achieves.

The program of the fourth example embodiment includes a packet reception processing function unit 411, an arrival time information storage processing function unit 421, a packet arrival time computation processing function unit 431, a valid packet extraction processing function unit 441, and an arrival time change model identification processing function unit 451. Further, the program is configured to include an available band computation processing function unit 461 and a received data measurement processing function unit 471.

The respective processing function units are units that achieve the functions of the respective function units constituting the network band measurement device 40, described with reference to FIG. 19, in a software manner.

That is, the packet reception processing function unit 411 and the arrival time information storage processing function unit 421 achieve the functions of the packet reception unit 41 and the arrival time information storage unit 42, respectively. The packet arrival time computation processing function unit 431 and the valid packet extraction processing function unit 441 achieve the functions of the packet arrival time computation unit 43 and the valid packet extraction unit 44, respectively. The arrival time change model identification processing function unit 451 and the available band computation processing function unit 461 achieve the functions of the arrival time change model identification unit 45 and the available band computation unit 46, respectively. The received data measurement processing function unit 471 achieves the function of the received data measurement unit 47.

As described above, the present example embodiment includes a configuration in which measurement of a data receiving speed of a received packet train is performed when valid packets that match a desired arrival time change model cannot be extracted due to significant influence from external disturbances.

Therefore, in the present example embodiment, it is possible to compute an available band with high accuracy and by a simple configuration even in a network environment where delay irregularly occurs when valid packets that match the desired arrival time change model can be extracted.

On the other hand, it is possible to perform the measurement of a data receiving speed of the received packet train even when valid packets that match the desired arrival time change model cannot be extracted due to significant influence from external disturbances.

Fifth Example Embodiment

Next, with reference to FIGS. 23 to 26, a fifth example embodiment will be described.

Figure 23:
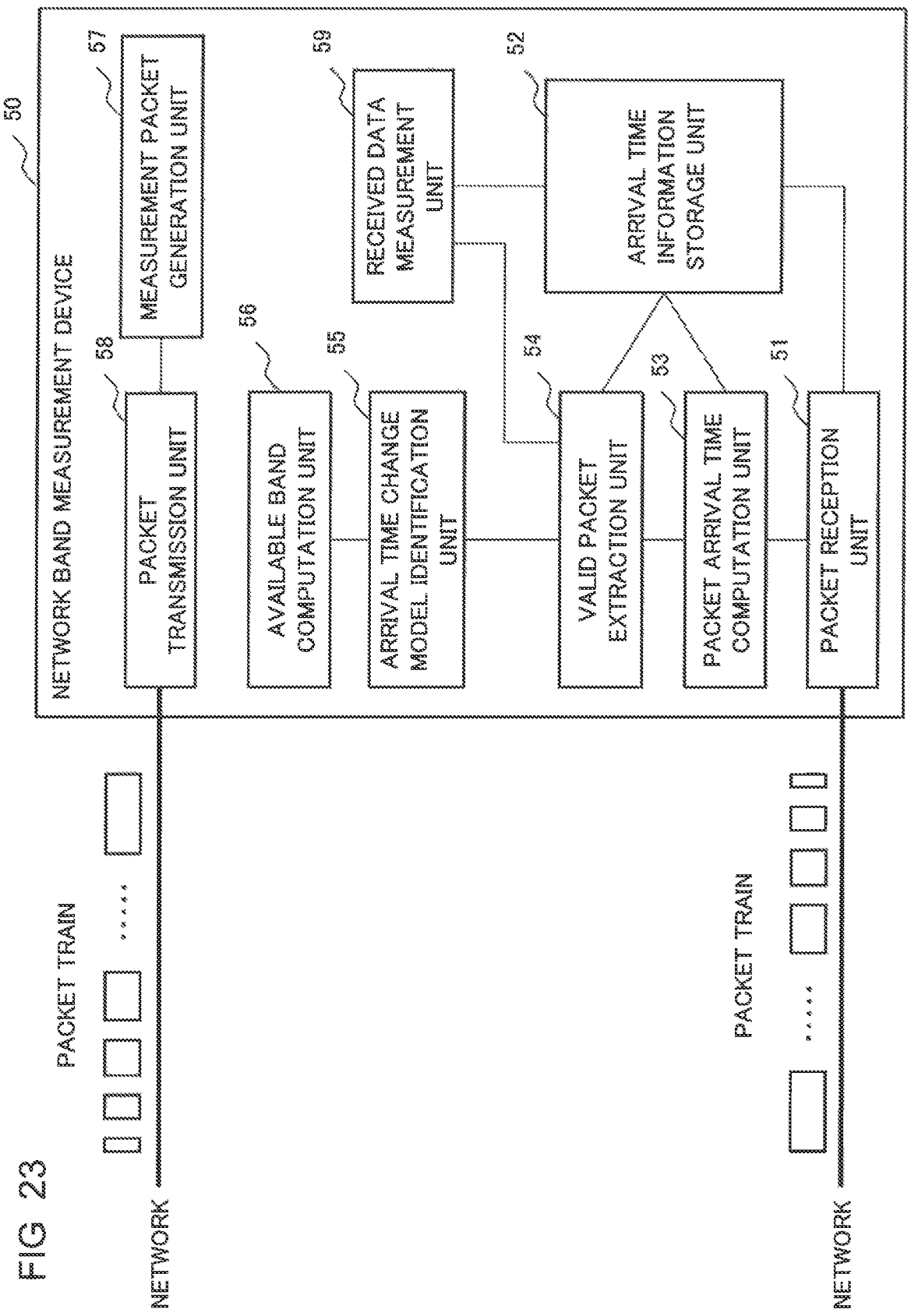
FIG. 23 is a block diagram exemplifying a configuration of a network band measurement device according to a fifth example embodiment of the present invention.

FIG. 23 is a block diagram exemplifying a configuration of a network band measurement device according to the fifth example embodiment of the present invention.

A network band measurement device 50 of the fifth example embodiment, as with the network band measurement device 30 of the third example embodiment, described with reference to FIG. 15, has a configuration including a measurement packet generation unit 57 and a packet transmission unit 58. The network band measurement device 50 of the fifth example embodiment differs from the network band measurement device 30 of the third example embodiment in including a received data measurement unit 59.

Of function units of the network band measurement device 50, each of a packet reception unit 51, an arrival time information storage unit 52, a packet arrival time computation unit 53, an arrival time change model identification unit 55, and an available band computation unit 56 has the same function as a corresponding function unit of the network band measurement device 30. Further, the measurement packet generation unit 57 and the packet transmission unit 58 that the network band measurement device 50 includes also have the same functions as corresponding function units of the network band measurement device 30.

That is, the packet reception unit 51 and the arrival time information storage unit 52 have the same functions as the packet reception unit 31 and the arrival time information storage unit 32, respectively. The packet arrival time computation unit 53, the arrival time change model identification unit 55, and the available band computation unit 56 have the same functions as the packet arrival time computation unit 33, the arrival time change model identification unit 35, and the available band computation unit 36, respectively. The measurement packet generation unit 57 and the packet transmission unit 58 have the same functions as the measurement packet generation unit 37 and the packet transmission unit 38, respectively. A description of these functions that are the same as those of the network band measurement device 30 of the third example embodiment will be omitted.

On the other hand, the valid packet extraction unit 54 has a different function from the valid packet extraction unit 34 of the network band measurement device 30 in terms of performing control of instructing the received data measurement unit 59.

Figure 24:
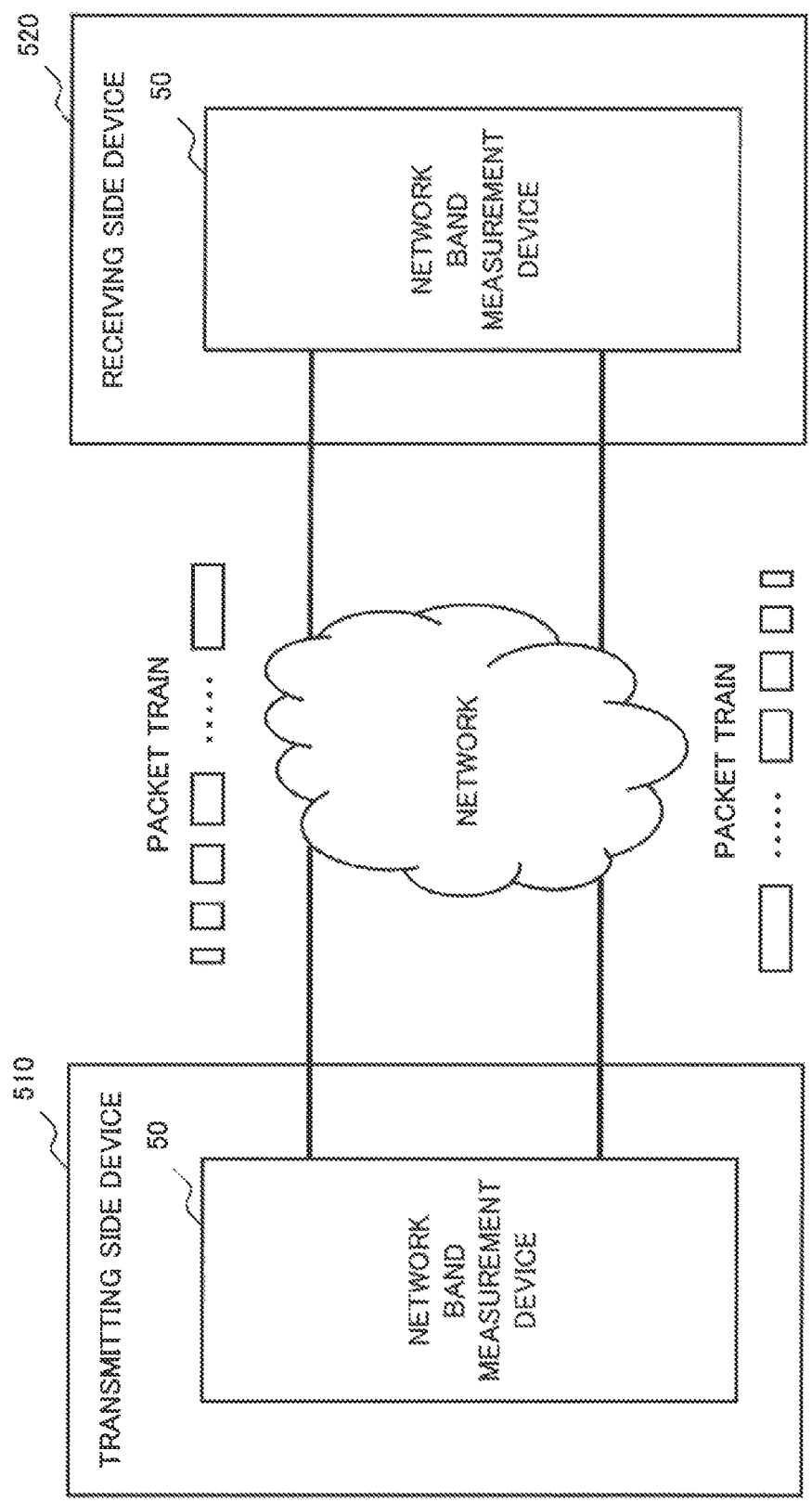
FIG. 24 is a block diagram exemplifying a configuration of a network band measurement system according to the fifth example embodiment of the present invention.

FIG. 24 is a block diagram exemplifying a configuration of a network band measurement system according to the fifth example embodiment of the present invention.

A network band measurement system 5 of the fifth example embodiment has a configuration in which the network band measurement devices 50 are respectively used as a transmitting side device 510 and a receiving side device 520 and are interconnected via a network.

In the network band measurement system 5, the packet transmission unit 58 in the network band measurement device 50 of the transmitting side device 510 is connected to the packet reception unit 51 in the network band measurement device 50 of the receiving side device 520. The packet transmission unit 58 in the network band measurement device 50 of the receiving side device 520 is connected to the packet reception unit 51 in the network band measurement device 50 of the transmitting side device 510.

In this manner, the network band measurement system 5 of the present example embodiment is configured to measure both an available band in the downstream direction, directed from the transmitting side device 510 to the receiving side device 520, and an available band in the upstream direction, directed from the receiving side device 520 to the transmitting side device 510. Thus, the network band measurement system 5 can be used in the same manner as the network band measurement system 3 of the third example embodiment.

Functions of the network band measurement device 50 of the present example embodiment that are different from those of the network band measurement device 30 of the third example embodiment will be described below.

Note that the functions of the network band measurement device 50 that are different from those of the network band measurement device 30 are the same as the functions that were described above as functions of the network band measurement device 40 of the fourth example embodiment that are different from those of the network band measurement device 20 of the second example embodiment.

The valid packet extraction unit 54 of the present example embodiment determines whether change in arrival time of respective measurement packets constituting a packet train matches an incremental arrival time change model or a decremental arrival time change model. The valid packet extraction unit 54 extracts as valid packets a series of measurement packets in an interval where change in arrival time matches the determined arrival time change model.

Further, when the valid packet extraction unit 54 cannot determine a series of measurement packets that match the determined arrival time change model, the valid packet extraction unit 54 instructs the received data measurement unit 59 to compute a data receiving speed of the received packet train.

That is, when the valid packet extraction unit 54 determines a series of measurement packets that match a predetermined arrival time change model, the valid packet extraction unit 54 extracts as valid packets a series of measurement packets in an interval where change in the arrival time matches the predetermined arrival time change model and performs measurement processing of an available band. On the other hand, when the valid packet extraction unit 54 cannot determine a series of measurement packets that match the predetermined arrival time change model, the valid packet extraction unit 54 performs measurement processing of a data receiving speed of the received packet train.

Such a configuration enables a data receiving speed of the received packet train to be measured even when valid packets that match a desired arrival time change model cannot be extracted due to significant influence from external disturbances.

When the received data measurement unit 59 receives an instruction to perform measurement of a data receiving speed from the valid packet extraction unit 54, the received data measurement unit 59 refers to stored information in the arrival time information storage unit 52.

The received data measurement unit 59, based on a difference between a reception time of the first measurement packet and a reception time of the last measurement packet, and an integrated value of respective packet sizes of a series of measurement packets constituting the received packet train, computes a data receiving speed of the packet train. That is, a reception period taken to receive the series of measurement packets constituting the packet train is computed from a difference between the reception time of a packet having a packet number "1" and the reception time of a packet having a packet number "110" in information in the arrival time information storage unit described with reference to FIG. 10. An integrated value of the packet sizes of the respective packets having packet numbers "1" to "110" is computed as a received measurement packet amount. The data receiving speed is computed by dividing the received measurement packet amount by the reception period.

Figure 25A:
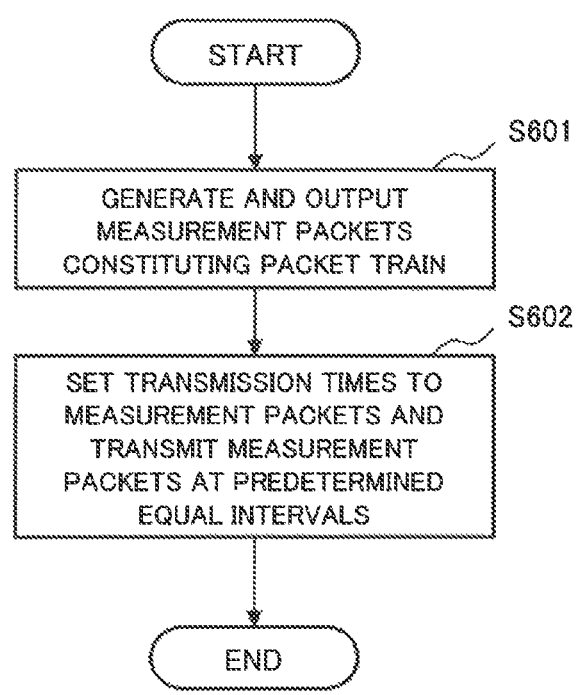
FIGS. 25A and 25B are flow diagrams exemplifying operation of a network band measurement method according to the fifth example embodiment of the present invention.
Figure 25B:
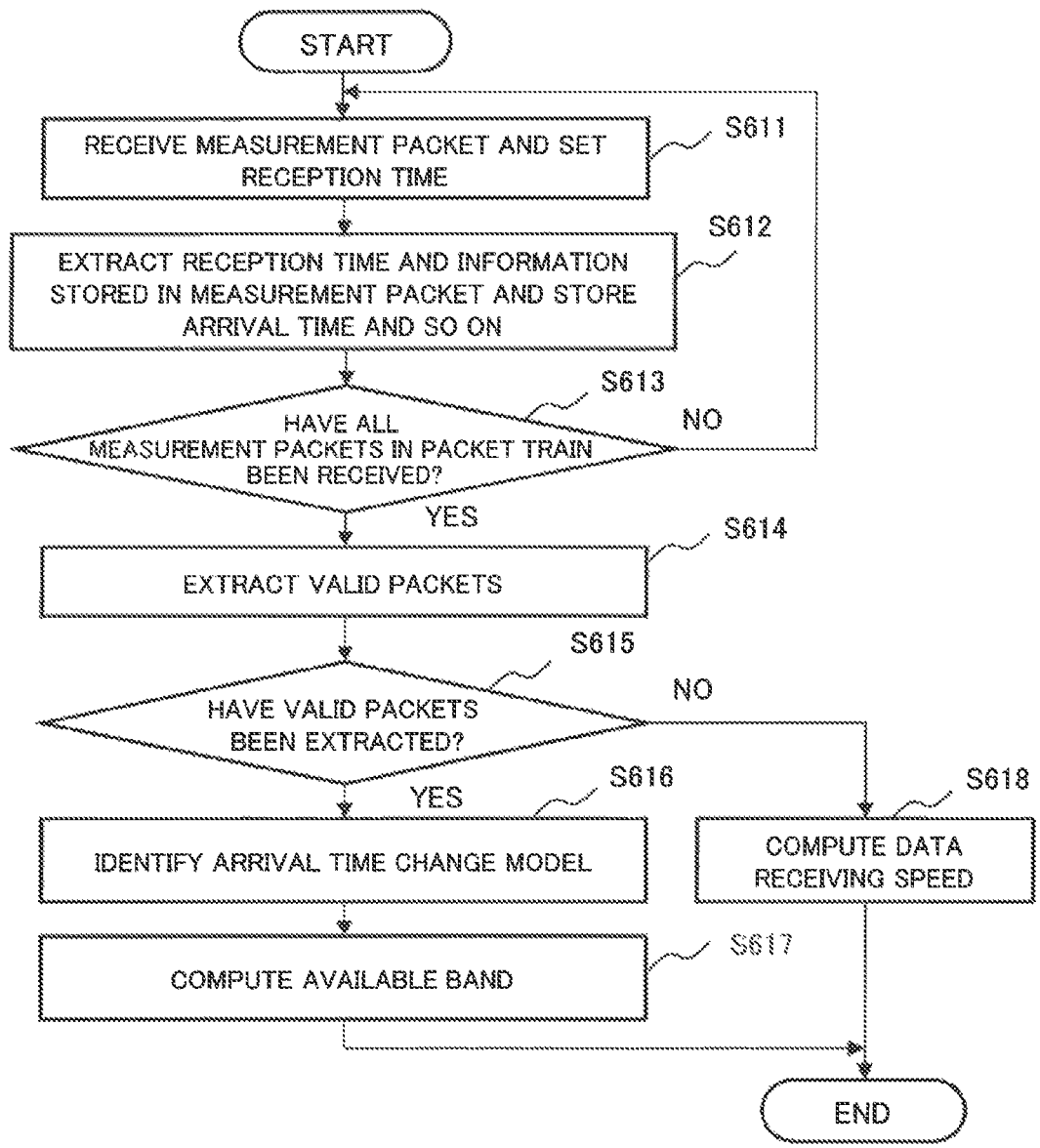

FIGS. 25A and 25B are flow diagrams exemplifying operation of a network band measurement method according to the fifth example embodiment of the present invention.

FIG. 25A illustrates an operation of transmitting a packet train. Since operation in steps S601 and S602 is the same as the operation in steps S401 and S402 in the operation of the network band measurement method of the third example embodiment, described with reference to FIGS. 17A and 17B, a description thereof will be omitted.

In addition, since operation from steps S611 to S618 in FIG. 25B is the same as the operation from steps S501 and S508 in the operation of the network band measurement method of the fourth example embodiment, described with reference to FIG. 21, a description thereof will be omitted.

Further, each of the functions of the respective function units constituting the network band measurement device 50 can be achieved by, in a general computer device having a hardware configuration as exemplified in FIG. 6, the computer operating in accordance with a predetermined program.

Figure 26:
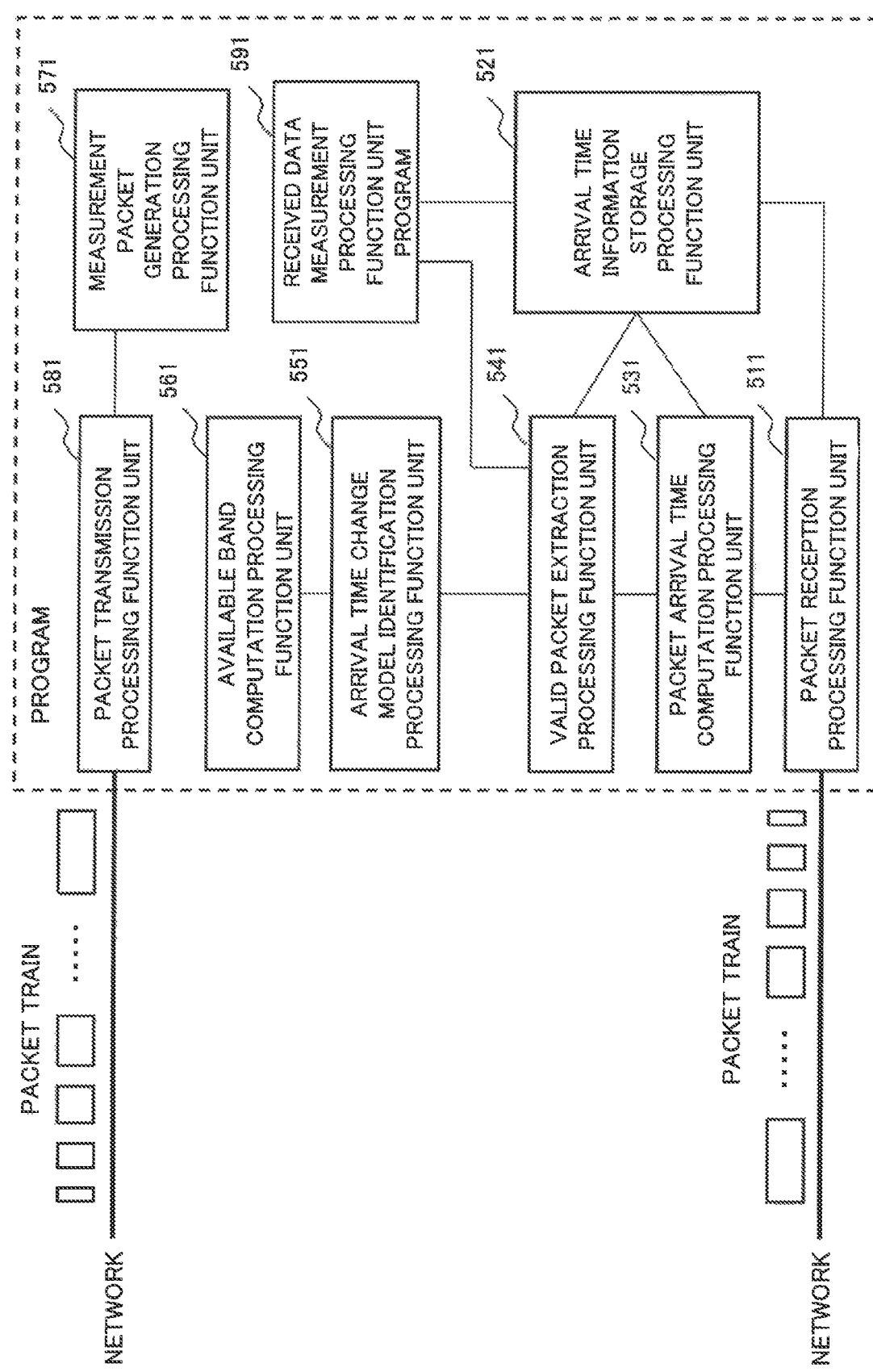
FIG. 26 is a block diagram exemplifying a configuration of function means that a program according to the fifth example embodiment of the present invention achieves.

FIG. 26 is a block diagram exemplifying a configuration of function means that a program according to the fifth example embodiment of the present invention achieves.

The program of the fifth example embodiment includes a packet reception processing function unit 511, an arrival time information storage processing function unit 521, a packet arrival time computation processing function unit 531, a valid packet extraction processing function unit 541, and an arrival time change model identification processing function unit 551. Further, the program is configured to include an available band computation processing function unit 561 and therewith a measurement packet generation processing function unit 571, a packet transmission processing function unit 581, and a received data measurement processing function unit 591.

The respective processing function units are units that achieve the functions of the respective function units constituting the network band measurement device 50, described with reference to FIG. 23, in a software manner.

That is, the packet reception processing function unit 511 and the arrival time information storage processing function unit 521 achieve the functions of the packet reception unit 51 and the arrival time information storage unit 52, respectively. The packet arrival time computation processing function unit 531 and the valid packet extraction processing function unit 541 achieve the functions of the packet arrival time computation unit 53 and the valid packet extraction unit 54, respectively. The arrival time change model identification processing function unit 551 and the available band computation processing function unit 561 achieve the functions of the arrival time change model identification unit 55 and the available band computation unit 56, respectively. Further, the measurement packet generation processing function unit 571 and the packet transmission processing function unit 581 achieve the functions of the measurement packet generation unit 57 and the packet transmission unit 58, respectively. The received data measurement processing function unit 591 achieves the function of the received data measurement unit 59.

As described above, the present example embodiment, as with the third example embodiment, is configured to measure available bands in both the upstream and downstream directions between the transmitting side device 510 and the receiving side device 520. In addition, the present example embodiment, as with the fourth example embodiment, includes a configuration in which measurement of a data receiving speed of a received packet train is performed when valid packets that match a desired arrival time change model cannot be extracted due to significant influence from external disturbances. The other part of the configuration is the same as that of the second example embodiment.

Measurement of available bands in both the upstream and downstream directions between the transmitting side device 510 and the receiving side device 520 enables an available band of a black box section to be observed from the outside and existence of a bottleneck serving as a deterioration factor in a service use feeling to be perceived.

In the present example embodiment, it is possible to compute an available band with high accuracy and by a simple configuration even in a network environment where delay irregularly occurs when valid packets that match the desired arrival time change model can be extracted.

On the other hand, it is possible to perform the measurement of a data receiving speed of the received packet train even when valid packets that match the desired arrival time change model cannot be extracted due to significant influence from external disturbances.

Note that all or a portion of the respective example embodiments described above may be described as in the following supplementary notes, but the present invention is not limited thereto.

(Supplementary note 1) A network band measurement device including:

an arrival time measurement means for receiving, from a network, a packet train that is a plurality of measurement packets the packet sizes of which successively increase or decrease by a fixed number for each packet and is transmitted at predetermined equal intervals, each measurement packet including at least a packet number, a packet size, and a transmission time, and measuring arrival time of the respective measurement packets constituting the packet train, based on reception times of the received measurement packets and the transmission times included in the measurement packets;

a valid packet extraction means for extracting as valid packets a series of measurement packets in an interval where change in the measured arrival time matches an arrival time change model having a predetermined pattern; and an available band measurement means for, in the arrival time change model indicated by the valid packets, computing an available band of the network, using a measurement packet, among a series of measurement packets having the same arrival time, that has a maximum packet size.

(Supplementary note 2) The network band measurement device according to supplementary note 1, wherein the arrival time change model indicated by the valid packets includes a first pattern portion that is constituted by a series of measurement packets having the same arrival time and either a second pattern portion that is constituted by a series of measurement packets the arrival time of which successively increases as the packet number increases or a third pattern portion that is constituted by a series of measurement packets the arrival time of which successively decreases as the packet number increases.

(Supplementary note 3) The network band measurement device according to supplementary note 2, wherein the arrival time measurement means includes:

a packet reception unit that receives the measurement packets constituting the packet train and outputs reception times of the measurement packets and the transmission times, the packet sizes, and the packet numbers included in the measurement packets;

a packet arrival time computation function unit that, based on the reception times of a series of measurement packets constituting the packet train and the transmission times included in the measurement packets, computes arrival time of the respective measurement packets and computes as arrival time change information differences in the arrival time between respective pairs of adjacent measurement packets; and an arrival time information storage unit that stores the transmission times, the reception times, the packet sizes, and the arrival time of the measurement packets constituting the packet train and the arrival time change information in association with the packet numbers of the measurement packets.

(Supplementary note 4) The network band measurement device according to supplementary note 3, wherein the valid packet extraction means refers to the arrival time change information associated with the packet numbers of the measurement packets stored in the arrival time information storage unit, identifies the first pattern portion and either the second pattern portion or the third pattern portion within a predetermined acceptable error range of the arrival time change information, and extracts as the valid packets an incremental arrival time change model in which the first pattern portion changes to the second pattern portion or a decremental arrival time change model in which the third pattern portion changes to the first pattern portion.

(Supplementary note 5) The network band measurement device according to supplementary note 4, wherein
the available band measurement means,
when the valid packet extraction means extracts the incremental arrival time change model, computes an available band of the network, using the packet size of a measurement packet having a last packet number among a series of measurement packets constituting the first pattern portion, and,
when the valid packet extraction means extracts the decremental arrival time change model, computes an available band of the network, using the packet size of a measurement packet having a first packet number among a series of measurement packets constituting the first pattern portion.

(Supplementary note 6) The network band measurement device according to any one of supplementary notes 1 to 5 further including
a received data measurement means, wherein
when the valid packet extraction means cannot extract the valid packets, the valid packet extraction means instructs the received data measurement means to compute a receiving speed of the packet train, and
the received data measurement means, based on a difference between the reception time of a first measurement packet and the reception time of a last measurement packet and an integrated value of the packet sizes of a series of measurement packets constituting the received packet train, computes a receiving speed of the packet train.

(Supplementary note 7) The network band measurement device according to any one of supplementary notes 1 to 6 further including:
a measurement packet generation means for generating a plurality of measurement packets the packet sizes of which successively increase or decrease by a fixed number for each packet and outputting as a packet train a series of the generated measurement packets, each measurement packet including at least a packet number and a packet size; and
a measurement packet transmission means for transmitting the packet train at predetermined equal intervals, each of the measurement packets including a transmission time at which the measurement packet is transmitted to the network.

(Supplementary note 8) A network band measurement system including:
a transmitting side device that includes:
a measurement packet generation means for generating a plurality of measurement packets the packet sizes of which successively increase or decrease by a fixed number for each packet and outputting as a packet train a series of the generated measurement packets, each measurement packet including at least a packet number and a packet size; and
a measurement packet transmission means for transmitting the packet train at predetermined equal intervals, each of the measurement packets including a transmission time at which the measurement packet is transmitted to a network; and
a network band measurement device according to any one of supplementary notes 1 to 6 as a receiving side device connected to the transmitting side device via the network.

(Supplementary note 9) A network band measurement system including
network band measurement devices according to supplementary note 7 respectively serving as a transmitting side device and a receiving side device via a network.

(Supplementary note 10) A network band measurement method including:
receiving, from a network, a packet train that is a plurality of measurement packets the packet sizes of which successively increase or decrease by a fixed number for each packet and is transmitted at predetermined equal intervals, each measurement packet including at least a packet number, a packet size, and a transmission time;
measuring arrival time of the respective measurement packets constituting the packet train, based on reception times of the received measurement packets and the transmission times included in the measurement packets;
extracting as valid packets a series of measurement packets in an interval where change in the measured arrival time matches an arrival time change model having a predetermined pattern; and
in the arrival time change model indicated by the valid packets, computing an available band of the network, using a measurement packet, among a series of measurement packets having the same arrival time, that has a maximum packet size.

(Supplementary note 11) A network band measurement method including:
generating a plurality of measurement packets the packet sizes of which successively increase or decrease by a fixed number for each packet and transmitting as a packet train a series of the generated measurement packets at predetermined equal intervals, each measurement packet including at least a packet number, a packet size, and a transmission time at which the measurement packet is transmitted to a network;
measuring arrival time of the respective measurement packets constituting the packet train, based on reception times of the measurement packets received from the network and the transmission times included in the measurement packets;
extracting as valid packets a series of measurement packets in an interval where change in the measured arrival time matches an arrival time change model having a predetermined pattern; and
in the arrival time change model indicated by the valid packets, computing an available band of the network, using a measurement packet, among a series of measurement packets having the same arrival time, that has a maximum packet size.

(Supplementary note 12) The network band measurement method according to supplementary note 10 or 11, wherein
the arrival time change model indicated by the valid packets includes a first pattern portion that is constituted by a series of measurement packets having the same arrival time and either a second pattern portion that is constituted by a series of measurement packets the arrival time of which successively increases as the packet number increases or a third pattern portion that is constituted by a series of measurement packets the arrival time of which successively decreases as the packet number increases.

(Supplementary note 13) The network band measurement method according to supplementary note 12, wherein
measurement of the arrival time of the respective measurement packets constituting the packet train includes:
receiving the measurement packets constituting the packet train and outputting reception times of the measurement packets and the transmission times, the packet sizes, and the packet numbers included in the measurement packets;

based on the reception times of a series of measurement packets constituting the packet train and the transmission times included in the measurement packets, computing arrival time of the respective measurement packets and computing as arrival time change information differences in the arrival time between respective pairs of adjacent measurement packets; and storing the transmission times, the reception times, the packet sizes, and the arrival time of the measurement packets constituting the packet train and the arrival time change information in association with the packet numbers of the measurement packets.

(Supplementary note 14) The network band measurement method according to supplementary note 13, wherein extraction of the valid packets includes
referring to the stored arrival time change information associated with the packet numbers of the measurement packets, identifying the first pattern portion and either the second pattern portion or the third pattern portion within a predetermined acceptable error range of the arrival time change information, and extracting as the valid packets an incremental arrival time change model in which the first pattern portion changes to the second pattern portion or a decremental arrival time change model in which the third pattern portion changes to the first pattern portion.

(Supplementary note 15) The network band measurement method according to supplementary note 14, wherein computation of the available band includes:
when the incremental arrival time change model is extracted in the extraction of the valid packets, computing an available band, using the packet size of a measurement packet having a last packet number among a series of measurement packets constituting the first pattern portion, and, when the decremental arrival time change model is extracted in the extraction of the valid packets, computing an available band, using the packet size of a measurement packet having a first packet number among a series of measurement packets constituting the first pattern portion.

(Supplementary note 16) The network band measurement method according to any one of supplementary notes 10 to 15 further including:

when the valid packets cannot be extracted, instructing computation of a receiving speed of the packet train; and based on the instruction, computing a receiving speed of the packet train, based on a difference between the reception time of a first measurement packet and the reception time of a last measurement packet and an integrated value of the packet sizes of a series of measurement packets constituting the packet train.

(Supplementary Note 17) A program causing a computer to operate as:

an arrival time measurement function means for receiving, from a network, a packet train that is a plurality of measurement packets the packet sizes of which successively increase or decrease by a fixed number for each packet and is transmitted at predetermined equal intervals, each measurement packet including at least a packet number, a packet size, and a transmission time, and measuring arrival time of the respective measurement packets constituting the packet train, based on reception times of the received measurement packets and the transmission times included in the measurement packets;

a valid packet extraction function means for extracting as valid packets a series of measurement packets in an interval where change in the measured arrival time matches an arrival time change model having a predetermined pattern; and an available band measurement function means for, in the arrival time change model indicated by the valid packets, computing an available band of the network, using a measurement packet, among a series of measurement packets having the same arrival time, that has a maximum packet size.

(Supplementary note 18) The program according to supplementary note 17, wherein the arrival time change model indicated by the valid packets includes a first pattern portion that is constituted by a series of measurement packets having the same arrival time and either a second pattern portion that is constituted by a series of measurement packets the arrival time of which successively increases as the packet number increases or a third pattern portion that is constituted by a series of measurement packets the arrival time of which successively decreases as the packet number increases.

(Supplementary note 19) The program according to supplementary note 18, wherein the arrival time measurement function means includes:
a packet reception processing function unit that receives the measurement packets constituting the packet train and outputs reception times of the measurement packets and the transmission times, the packet sizes, and the packet numbers included in the measurement packet;

a packet arrival time computation processing function unit that, based on the reception times of a series of measurement packets constituting the packet train and the transmission times included in the measurement packets, computes arrival time of the respective measurement packets and computes as arrival time change information differences in the arrival time between respective pairs of adjacent measurement packets; and an arrival time information storage processing function unit that stores the transmission times, the reception times, the packet sizes, and the arrival time of the measurement packets constituting the packet train and the arrival time change information in association with the packet numbers of the measurement packets.

(Supplementary note 20) The program according to supplementary note 19, wherein the valid packet extraction function means refers to the arrival time change information associated with the packet numbers of the measurement packets stored in the arrival time information storage processing function unit, identifies the first pattern portion and either the second pattern portion or the third pattern portion within a predetermined acceptable error range of the arrival time change information, and extracts as the valid packets an incremental arrival time change model in which the first pattern portion changes to the second pattern portion or a decremental arrival time change model in which the third pattern portion changes to the first pattern portion.

(Supplementary note 21) The program according to supplementary note 20, wherein the available band measurement function means,
when the valid packet extraction function means extracts the incremental arrival time change model, computes an available band, using the packet size of a measurement packet having a last packet number among a series of measurement packets constituting the first pattern portion, and, when the valid packet extraction function means extract the decremental arrival time change model, computes an available band, using the packet size of a measurement packet having a first packet number among a series of measurement packets constituting the first pattern portion.

(Supplementary Note 22) The program according to any one of supplementary notes 17 to 21 further including a received data measurement function means, wherein when the valid packet extraction function means cannot extract the valid packets, the valid packet extraction function means instructs the received data measurement function means to compute a receiving speed of the packet train, and the received data measurement function means, based on a difference between the reception time of a first measurement packet and the reception time of a last measurement packet and an integrated value of the packet sizes of a series of measurement packets constituting the received packet train, computes a receiving speed of the packet train.

(Supplementary Note 23) The program according to any one of supplementary notes 17 to 22 further including:

a measurement packet generation function means for generating a plurality of measurement packets the packet sizes of which successively increase or decrease by a fixed number for each packet and outputting as a packet train a series of the generated measurement packets, each measurement packet including at least a packet number and a packet size; and a measurement packet transmission function means for transmitting the packet train at predetermined equal intervals, each of the measurement packets including a transmission time at which the measurement packet is transmitted to the network.

The present invention was described above through the example embodiments thereof, but the present invention is not limited to the above example embodiments. Various modifications that could be understood by a person skilled in the art may be applied to the configurations and details of the present invention within the scope of the present invention.

REFERENCE SIGNS LIST 1, 2, 3, 4, 5 Network band measurement system
10, 20, 30, 40, 50 Network band measurement device
11 Arrival time measurement means
12 Valid packet extraction means
13 Available band measurement means
21, 31, 41, 51 Packet reception unit
22, 32, 42, 52 Arrival time information storage unit
23, 33, 43, 53 Packet arrival time computation unit
24, 34, 44, 54 Valid packet extraction unit
25, 35, 45, 55 Arrival time change model identification unit
26, 36, 46, 56 Available band computation unit
47, 59 Received data measurement unit
101 CPU
102 Main storage unit
103 Auxiliary storage unit
104 Communication unit
105 Input/output unit
106 System bus
110, 210, 310, 410, 510 Transmitting side device
120, 220, 320, 420, 520 Receiving side device
111 Arrival time measurement function means
121 Valid packet extraction function means
131 Available band measurement function means
211, 311, 411, 511 Packet reception processing function unit
221, 321, 421, 521 Arrival time information storage processing function unit
231, 331, 431, 531 Packet arrival time computation processing function unit
241, 341, 441, 541 Valid packet extraction processing function unit
251, 351, 451, 551 Arrival time change model identification processing function unit
261, 361, 461, 561 Available band computation processing function unit
371, 571 Measurement packet generation processing function unit
381, 581 Packet transmission processing function unit
471, 591 Received data measurement processing function unit
1101 Measurement packet generation means
1102 Measurement packet transmission means
37, 57, 2101, 4101 Measurement packet generation unit
38, 58, 2102, 4102 Packet transmission unit

The invention claimed is:

1. A network band measurement device including:
an arrival time measurer configured to receive, from a network, a packet train that is a plurality of measurement packets packet sizes of which successively increase or decrease by a fixed number for each packet and is transmitted at predetermined equal intervals, each measurement packet including at least a packet number, a packet size, and a transmission time, and measuring arrival time of respective measurement packets constituting the packet train, based on reception times of received measurement packets and transmission times included in the measurement packets;
a valid packet extractor configured to extract as valid packets a series of measurement packets in an interval where change in the measured arrival time matches an arrival time change model having a predetermined pattern; and
an available band measurer configured to, in the arrival time change model indicated by the valid packets, compute an available band of the network, using a measurement packet, among a series of measurement packets having the same arrival time, that has a maximum packet size.

2. The network band measurement device according to claim 1, wherein
the arrival time change model indicated by the valid packets includes a first pattern portion that is constituted by a series of measurement packets having the same arrival time and either a second pattern portion that is constituted by a series of measurement packets the arrival time of which successively increases as the packet number increases or a third pattern portion that is constituted by a series of measurement packets the arrival time of which successively decreases as the packet number increases.

3. The network band measurement device according to claim 2, wherein
the arrival time measurer includes:
a packet reception unit configured to receive the measurement packets constituting the packet train and outputs reception times of the measurement packets and the transmission times, the packet sizes, and the packet numbers included in the measurement packets;

a packet arrival time computation function unit configured to, based on the reception times of a series of measurement packets constituting the packet train and the transmission times included in the measurement packets, compute arrival time of the respective measurement packets and compute as arrival time change information differences in the arrival time between respective pairs of adjacent measurement packets; and an arrival time information storage unit configured to store the transmission times, the reception times, the packet sizes, and the arrival time of the measurement packets constituting the packet train and the arrival time change information in association with the packet numbers of the measurement packets.

4. The network band measurement device according to claim 3, wherein
the valid packet extractor refers to the arrival time change information associated with the packet numbers of the measurement packets stored in the arrival time information storage unit, identifies the first pattern portion and either the second pattern portion or the third pattern portion within a predetermined acceptable error range of the arrival time change information, and extracts as the valid packets an incremental arrival time change model in which the first pattern portion changes to the second pattern portion or a decremental arrival time change model in which the third pattern portion changes to the first pattern portion.

5. The network band measurement device according to claim 4, wherein
the available band measurer,
when the valid packet extractor extracts the incremental arrival time change model, computes an available band of the network, using the packet size of a measurement packet having a last packet number among a series of measurement packets constituting the first pattern portion, and,
when the valid packet extractor extracts the decremental arrival time change model, computes an available band of the network, using the packet size of a measurement packet having a first packet number among a series of measurement packets constituting the first pattern portion.

6. The network band measurement device according to claim 2 further including
a received data measurer, wherein
when the valid packet extractor cannot extract the valid packets, the valid packet extractor instructs the received data measurer to compute a receiving speed of the packet train, and
the received data measurer, based on a difference between the reception time of a first measurement packet and the reception time of a last measurement packet and an integrated value of the packet sizes of a series of measurement packets constituting the received packet train, computes a receiving speed of the packet train.

7. The network band measurement device according to claim 2 further including:
a measurement packet generator configured to generate a plurality of measurement packets the packet sizes of which successively increase or decrease by a fixed number for each packet and outputting as a packet train a series of the generated measurement packets, each measurement packet including at least a packet number and a packet size; and
a measurement packet transmitter configured to transmit the packet train at predetermined equal intervals, each of the measurement packets including a transmission time at which the measurement packet is transmitted to the network.

8. A network band measurement system including:
a transmitting side device that includes:
a measurement packet generator configured to generate a plurality of measurement packets the packet sizes of which successively increase or decrease by a fixed number for each packet and outputting as a packet train a series of the generated measurement packets, each measurement packet including at least a packet number and a packet size; and
a measurement packet transmitter configured to transmit the packet train at predetermined equal intervals, each of the measurement packets including a transmission time at which the measurement packet is transmitted to a network; and
a network band measurement device according to claim 2 as a receiving side device connected to the transmitting side device via the network.

9. The network band measurement device according to claim 1 further including
a received data measurer, wherein
when the valid packet extractor cannot extract the valid packets, the valid packet extractor instructs the received data measurer to compute a receiving speed of the packet train, and
the received data measurer, based on a difference between the reception time of a first measurement packet and the reception time of a last measurement packet and an integrated value of the packet sizes of a series of measurement packets constituting the received packet train, computes a receiving speed of the packet train.

10. The network band measurement device according to claim 1 further including:
a measurement packet generator configured to generate a plurality of measurement packets the packet sizes of which successively increase or decrease by a fixed number for each packet and outputting as a packet train a series of the generated measurement packets, each measurement packet including at least a packet number and a packet size; and
a measurement packet transmitter configured to transmit the packet train at predetermined equal intervals, each of the measurement packets including a transmission time at which the measurement packet is transmitted to the network.

11. A network band measurement system including
network band measurement devices according to claim 10 respectively serving as a transmitting side device and a receiving side device via a network.

12. A network band measurement system including:
a transmitting side device that includes:
a measurement packet generator configured to generate a plurality of measurement packets the packet sizes of which successively increase or decrease by a fixed number for each packet and outputting as a packet train a series of the generated measurement packets, each measurement packet including at least a packet number and a packet size; and
a measurement packet transmitter configured to transmit the packet train at predetermined equal intervals, each of the measurement packets including a transmission time at which the measurement packet is transmitted to a network; and a network band measurement device according to claim 1 as a receiving side device connected to the transmitting side device via the network.

13. A network band measurement method including:
receiving, from a network, a packet train that is a plurality of measurement packets the packet sizes of which successively increase or decrease by a fixed number for each packet and is transmitted at predetermined equal intervals, each measurement packet including at least a packet number, a packet size, and a transmission time;
measuring arrival time of the respective measurement packets constituting the packet train, based on reception times of the received measurement packets and the transmission times included in the measurement packets;
extracting as valid packets a series of measurement packets in an interval where change in the measured arrival time matches an arrival time change model having a predetermined pattern; and
in the arrival time change model indicated by the valid packets, computing an available band of the network, using a measurement packet, among a series of measurement packets having the same arrival time, that has a maximum packet size.

14. The network band measurement method according to claim 13, wherein
the arrival time change model indicated by the valid packets includes a first pattern portion that is constituted by a series of measurement packets having the same arrival time and either a second pattern portion that is constituted by a series of measurement packets the arrival time of which successively increases as the packet number increases or a third pattern portion that is constituted by a series of measurement packets the arrival time of which successively decreases as the packet number increases.

15. The network band measurement method according to claim 14, wherein
measurement of the arrival time of the respective measurement packets constituting the packet train includes:
receiving the measurement packets constituting the packet train and outputting reception times of the measurement packets and the transmission times, the packet sizes, and the packet numbers included in the measurement packets;
based on the reception times of a series of measurement packets constituting the packet train and the transmission times included in the measurement packets, computing arrival time of the respective measurement packets and computing as arrival time change information differences in the arrival time between respective pairs of adjacent measurement packets; and
storing the transmission times, the reception times, the packet sizes, and the arrival time of the measurement packets constituting the packet train and the arrival time change information in association with the packet numbers of the measurement packets.

16. The network band measurement method according to claim 15, wherein
extraction of the valid packets includes
referring to the stored arrival time change information associated with the packet numbers of the measurement packets, identifying the first pattern portion and either the second pattern portion or the third pattern portion within a predetermined acceptable error range of the arrival time change information, and extracting as the valid packets an incremental arrival time change model in which the first pattern portion changes to the second pattern portion or a decremental arrival time change model in which the third pattern portion changes to the first pattern portion.

17. The network band measurement method according to claim 16, wherein
computation of the available band includes:
when the incremental arrival time change model is extracted in the extraction of the valid packets, computing an available band, using the packet size of a measurement packet having a last packet number among a series of measurement packets constituting the first pattern portion, and,
when the decremental arrival time change model is extracted in the extraction of the valid packets, computing an available band, using the packet size of a measurement packet having a first packet number among a series of measurement packets constituting the first pattern portion.

18. The network band measurement method according to claim 13 further including:
when the valid packets cannot be extracted, instructing computation of a receiving speed of the packet train; and
based on the instruction, computing a receiving speed of the packet train, based on a difference between the reception time of a first measurement packet and the reception time of a last measurement packet and an integrated value of the packet sizes of a series of measurement packets constituting the packet train.

19. A network band measurement method including:
generating a plurality of measurement packets the packet sizes of which successively increase or decrease by a fixed number for each packet and transmitting as a packet train a series of the generated measurement packets at predetermined equal intervals, each measurement packet including at least a packet number, a packet size, and a transmission time at which the measurement packet is transmitted to a network;
measuring arrival time of the respective measurement packets constituting the packet train, based on reception times of the measurement packets received from the network and the transmission times included in the measurement packets;
extracting as valid packets a series of measurement packets in an interval where change in the measured arrival time matches an arrival time change model having a predetermined pattern; and
in the arrival time change model indicated by the valid packets, computing an available band of the network, using a measurement packet, among a series of measurement packets having the same arrival time, that has a maximum packet size.

20. A non-transitory recording medium of a program, the program causing a computer to operate as:
an arrival time measurer configured to receive, from a network, a packet train that is a plurality of measurement packets packet sizes of which successively increase or decrease by a fixed number for each packet and is transmitted at predetermined equal intervals, each measurement packet including at least a packet number, a packet size, and a transmission time, and measuring arrival time of respective measurement packets constituting the packet train, based on reception times of received measurement packets and transmission times included in the measurement packets;

a valid packet extractor configured to extract as valid packets a series of measurement packets in an interval where change in the measured arrival time matches an arrival time change model having a predetermined pattern; and an available band measurer configured to, in the arrival time change model indicated by the valid packets, compute an available band of the network, using a measurement packet, among a series of measurement packets having the same arrival time, that has a maximum packet size.

* * * * *